United States Patent
Stephenne et al.

(10) Patent No.: US 11,431,385 B2
(45) Date of Patent: Aug. 30, 2022

(54) MU-MIMO-AWARE SECTOR-CARRIER ALLOCATION

(71) Applicant: Telefonaktiebolaget LM Ericsson (publ), Stockholm (SE)

(72) Inventors: Alex Stephenne, Stittsville (CA); Jagadish Ghimire, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 52 days.

(21) Appl. No.: 16/760,174

(22) PCT Filed: Oct. 31, 2017

(86) PCT No.: PCT/IB2017/056757
§ 371 (c)(1),
(2) Date: Apr. 29, 2020

(87) PCT Pub. No.: WO2019/086928
PCT Pub. Date: May 9, 2019

(65) Prior Publication Data
US 2020/0343945 A1    Oct. 29, 2020

(51) Int. Cl.
*H04B 7/0452* (2017.01)
*H04W 72/04* (2009.01)
(Continued)

(52) U.S. Cl.
CPC ........ *H04B 7/0452* (2013.01); *H04W 72/044* (2013.01); *H04W 72/0406* (2013.01); *H04W 72/08* (2013.01); *H04W 92/20* (2013.01)

(58) Field of Classification Search
None
See application file for complete search history.

(56) References Cited

U.S. PATENT DOCUMENTS

| | | | | |
|---|---|---|---|---|
| 2006/0223520 A1* | 10/2006 | Laroia | ............... | H04W 52/143 455/422.1 |
| 2008/0268834 A1 | 10/2008 | Foschini et al. | | |
| 2017/0063503 A1* | 3/2017 | Liu | ............... | H04L 5/0051 |

OTHER PUBLICATIONS

Castaneda, Eduardo, et al., "An Overview on Resource Allocation Techniques for Multi-User MIMO Systems," IEEE Communications Surveys & Tutorials, vol. 19, No. 1, First Quarter 2017, pp. 239-284.

(Continued)

*Primary Examiner* — Hong Shao
(74) *Attorney, Agent, or Firm* — Withrow & Terranova, PLLC

(57) ABSTRACT

Systems and methods are disclosed herein that relate to Multi-User Multiple Input Multiple Output (MU-MIMO) aware sector-carrier allocation. In some embodiments, a method of operation of a network node in a wireless communication system comprises selecting a sector-carrier for a wireless device from among a plurality of sector-carriers in accordance with a MU-MIMO aware sector-carrier allocation procedure that takes into account possible MU-MIMO pairings for the wireless device on the plurality of sector-carriers. The method further comprises providing an indication of the sector-carrier selected for the wireless device to at least one node selected from a group consisting of: another network node and the wireless device. By taking into account possible MU-MIMO pairings for the wireless device when performing sector-carrier allocation, performance of the wireless communication system is improved.

30 Claims, 12 Drawing Sheets

(51) Int. Cl.
*H04W 72/08* (2009.01)
*H04W 92/20* (2009.01)

(56) References Cited

OTHER PUBLICATIONS

Lee, Daewon, "BSS load balancing for MU-MIMO," IEEE 802.11-10/1278r0, Nov. 9, 2010, 14 slides.
Nguyen, Hung Tuan, et al., "Downlink Radio Resource Management for LI E-Advanced System with Combined MU-MIMO and arrier Aggregation Features," IEEE 75th Vehicular Technology Conference (VTC Spring 2012), Piscataway, NJ, May 6-9, 2012, 5 pages.
International Search Report and Written Opinion for International Patent Application No. PCT/IB2017/056757, dated Feb. 1, 2018, 17 pages.
Examination Report for European Patent Application No. 17812268.5, dated Apr. 14, 2021, 5 pages.
Examination Report for European Patent Application No. 17812268.5, dated Sep. 27, 2021, 5 pages.

\* cited by examiner

MU-MIMO-AWARE SECTOR-CARRIER ALLOCATION

This application is a 35 U.S.C. § 371 national phase filing of International Application No. PCT/IB2017/056757, filed Oct. 31, 2017, the disclosure of which is incorporated herein by reference in its entirety.

TECHNICAL FIELD

The present disclosure relates to sector-carrier allocation in a wireless communication system.

BACKGROUND

A modern wireless network is typically deployed over many carrier frequencies of different propagation characteristics, coverage footprints, communication bandwidths, etc. Newer User Equipment devices (UEs) support a large number of frequency bands. Frequency management is a broad framework encompassing various aspects of dynamic allocation of carrier frequencies to UEs. In multi-sector deployments where the same carrier frequency is reused to cover distinct spatial regions around a base station or an access node, the term "sector-carrier" is used to identify a particular carrier frequency covering a particular spatial sector. Accordingly, frequency management in multi-sector deployments involves allocation of the sector-carriers to the UEs. A good frequency management solution can boost network performance by allocating the available sector-carriers to the right UEs.

Sector-carrier allocation procedures can either run locally within one base station (e.g., an enhanced or evolved Node B (eNB) or a Fifth Generation (5G) New Radio (NR) base station, which is referred to as a gNB) or among a group of base stations via a coordination interface such as, e.g., an X2 interface. The input to a sector-carrier allocation procedure is, among other things, the list of sector-carriers that the UE in question is capable of using, as well as the static and dynamic characteristics of these sector-carriers such as, e.g., bandwidth, spatial property, number of connected users, etc. Even though the intended objective of the sector-carrier allocation procedure is to optimize network performance, it is often seen as a load-balancing problem, where information about network load is exchanged among the coordinating nodes or processed locally within a given node and, based on the mutual load information as well as the capability of the UE in question, the UE is allocated to the appropriate sector-carrier. If the UE had already been allocated to one sub-optimal sector-carrier, the source node would handover the UE to the target sector-carrier, which may potentially be served by a different node. The framework for such handovers exists in most cellular technologies, including, for example, Long Term Evolution (LTE) and 5G NR.

The capacity of a frequency/sector-carrier is limited by its communication bandwidth. Traditionally, one or more UEs allocated to the same sector-carrier have to share the communication bandwidth based on the employed multiple access scheme. Without loss of generality, the case of Orthogonal Frequency Division Multiplexing (OFDM) transmission systems is considered, where the available transmission bandwidth is divided into allocable frequency resource units such as, e.g., Physical Resource Blocks (PRBs) in LTE. In traditional transmission systems, a given frequency resource is allocated to a maximum of one UE at a time. This is done to avoid otherwise severe intra-cell interference, which could render a transmission unsuccessful. With the advent of Multiple Input Multiple Output (MIMO) transmission techniques, it is possible to transmit more than one layer of data streams simultaneously to one UE by properly exploiting the spatial characteristics of the transmit-receive antenna pairs. Such spatial filtering is done in the form of transmit/receive signal precoding that allows multiple streams of data to be transmitted simultaneously, while maintaining orthogonality in the spatial domain. This is referred to as Single User MIMO (SU-MIMO). The quality of SU-MIMO transmission is affected by the number of transmit/receive antennas as well as the quality of the Channel State Information (CSI) including the so-called Precoding Matrix Indicator (PMI) that defines the precoding required to exploit the spatial dimension of the communication channel.

As the number of transmit and receive antennas increase and the channel sounding schemes/signaling become more advanced, MIMO can be generalized from SU-MIMO to Multi-User MIMO (MU-MIMO) whereby the same frequency resource can be used to transmit to more than one UE at a given time. Understandably though, it is not feasible between arbitrary pairs of UEs. Technology-dependent orthogonality-criteria are used to infer if a group of two or more UEs can be "paired" together for a MU-MIMO transmission. Note that a "MU-MIMO pair" is a group of two or more UEs that have been paired together for a MU-MIMO transmission. A good orthogonality criteria exploits the spatial characteristics of the MIMO channels of the UEs and chooses UEs such that it is possible to suppress/reject mutual interference. As used herein, orthogonality is to be understood in that context.

SUMMARY

Systems and methods are disclosed herein that relate to Multi-User Multiple Input Multiple Output (MU-MIMO) aware sector-carrier allocation. In some embodiments, a method of operation of a network node in a wireless communication system comprises selecting a sector-carrier for a wireless device from among a plurality of sector-carriers in accordance with a MU-MIMO aware sector-carrier allocation procedure that takes into account possible MU-MIMO pairings for the wireless device on the plurality of sector-carriers. The method further comprises providing an indication of the sector-carrier selected for the wireless device to at least one node selected from a group consisting of: another network node and the wireless device. By taking into account possible MU-MIMO pairings for the wireless device when performing sector-carrier allocation, performance of the wireless communication system is improved.

In some embodiments, for each sector-carrier of the plurality of sector-carriers, the possible MU-MIMO pairings for the sector-carrier are determined based on predicted channel state information for a plurality of wireless devices, comprising the wireless device, on the sector-carrier and predicted channel orthogonality between the predicted channels on the sector-carrier.

In some embodiments, selecting the sector-carrier for the wireless device from among the plurality of sector-carriers in accordance with the MU-MIMO aware sector-carrier allocation procedure comprises obtaining an actual or predicted channel state information for the wireless device for each of the plurality of sector-carriers, determining a subset of the plurality of sector-carriers for which the actual or predicted channel state information for the wireless device is better than a predefined threshold. Selecting the sector-carrier for the wireless device further comprises, for each sector-carrier in the subset of the plurality of sector-carriers, determining whether there are any possible MU-MIMO pairings for the wireless device on the sector-carrier. Selecting the sector-carrier for the wireless device further comprises selecting the sector-carrier for the wireless device from the subset of the plurality of sector-carriers in such a manner as to take into account any possible MU-MIMO pairings for the wireless device on the sector-carriers in the subset of the plurality of sector-carriers.

In some embodiments, selecting the sector-carrier for the wireless device from the subset of the plurality of sector-carriers in such a manner as to take into account any possible MU-MIMO pairings for the wireless device on the sector-carriers in the subset of the plurality of sector-carriers comprises, for each sector-carrier in the subset of the plurality of sector-carriers, computing a metric related to a predicted performance of the wireless communication system for an outcome of the MU-MIMO aware sector-carrier allocation procedure in which the sector-carrier is selected for the wireless device. The metric is a function of any possible MU-MIMO pairings for the wireless device on the sector-carrier. Selecting the sector-carrier for the wireless device further comprises selecting the sector-carrier for the wireless device from the subset of the plurality of sector-carriers based on the metrics computed for the sector-carriers in the subset of the plurality of sector-carriers. In some embodiments, the metric is a function of system throughput, energy performance, coverage, and/or quality of service.

In some embodiments, obtaining the actual or predicted channel state information for the wireless device for each of the plurality of sector-carriers comprises, for at least one of the plurality of sector-carriers, obtaining a predicted channel state information for the wireless device for the at least one of the plurality of sector-carriers, the predicted channel state information being predicted using model training that is based on live network data.

In some embodiments, obtaining the predicted channel state information for the wireless device for the at least one of the plurality of sector-carriers comprises coordinating and/or signaling with at least one other network node to train and/or use a model for predicting the channel state information.

In some embodiments, possible MU-MIMO pairings for the wireless device on the subset of the plurality of sector-carriers are pairings with other wireless devices on a same sector-carrier for which a predicted channel orthogonality satisfies a predefined condition that is indicative of good channel orthogonality. In some embodiments, the predicted channel orthogonality is predicted using model training based on live network data.

In some embodiments, the method further comprises coordinating and/or signaling with at least one other network node to train and/or use a model for predicting the channel orthogonality.

In some embodiments, the sector-carrier selected for the wireless device is an uplink sector-carrier for the wireless device, wherein selection of the uplink sector-carrier for the wireless device is decoupled from selection of a downlink sector-carrier for the wireless device.

In some embodiments, the sector-carrier selected for the wireless device is a downlink sector-carrier for the wireless device, wherein selection of the downlink sector-carrier for the wireless device is decoupled from selection of an uplink sector-carrier for the wireless device.

In some embodiments, the network node is a radio access node. In some embodiments, the plurality of sector-carriers are served by the radio access node. In some other embodiments, the plurality of sector-carriers comprise one or more sector-carriers served by the radio access node and one or more sector-carriers served by one or more other radio access nodes.

In some embodiments, the network node is a core network node, and the plurality of sector-carriers are served by two or more radio access nodes associated with the core network node.

Embodiments of a network node for a wireless communication system are also disclosed. In some embodiments, a network node for a wireless communication system comprises an interface and processing circuitry configured to select a sector-carrier for a wireless device from among a plurality of sector-carriers in accordance with a MU-MIMO aware sector-carrier allocation procedure that takes into account possible MU-MIMO pairings for the wireless device on the plurality of sector-carriers and provide an indication of the sector-carrier selected for the wireless device to at least one node selected from a group consisting of: another network node and the wireless device.

In some other embodiments, a method of operation of a network node in a wireless communication system comprises selecting a sector-carrier allocation for a plurality of wireless devices on a plurality of sector-carriers in accordance with a MU-MIMO aware sector-carrier allocation procedure that takes into account possible MU-MIMO pairings for the plurality of wireless devices on the plurality of sector-carriers, the sector-carrier allocation comprising a selected sector-carrier for each of the plurality of wireless devices, providing an indication of the sector-carrier allocation for the plurality of wireless devices to a set of nodes selected from a group consisting of: a set of nodes comprising another network node and a set of nodes comprising the plurality of wireless devices.

In some embodiments, for each sector-carrier of the plurality of sector-carriers, the possible MU-MIMO pairings for the sector-carrier are determined based on predicted channel state information for the plurality of wireless devices on the sector-carrier and predicted channel orthogonality between the predicted channels on the sector-carrier.

In some embodiments, selecting the sector-carrier allocation for the plurality of wireless devices in accordance with the MU-MIMO aware sector-carrier allocation procedure comprises obtaining an actual or predicted channel state information for each of the plurality of wireless devices for each of the plurality of sector-carriers, determining a plurality of Wireless Device-Sector-Carrier (WD-SC) pairings for which the actual or predicted channel state information is better than a predefined threshold, and identifying a plurality of possible MU-MIMO pairings based on the plurality of WD-SC pairings, wherein each possible MU-MIMO pairing comprises a first wireless device on a particular sector-carrier defined by a first WD-SC pairing and a second wireless device on the particular sector-carrier defined by a second WD-SC pairing for which a predicted channel orthogonality satisfies a predefined condition. Selecting the sector-carrier allocation for the plurality of wireless devices in accordance with the MU-MIMO aware sector-carrier allocation procedure further comprises, for each possible sector-carrier allocation of two or more possible sector-carrier allocations, computing a metric that is related to a predicted performance of the wireless communication system for the possible sector-carrier allocation that takes into account any of the plurality of possible MU- MIMO pairings that are applicable to the possible sector-carrier allocation. Selecting the sector-carrier allocation for the plurality of wireless devices in accordance with the MU-MIMO aware sector-carrier allocation procedure further comprises selecting the sector-carrier allocation for the plurality of wireless devices from the two or more possible sector-carrier allocations based on the metrics computed for the two or more possible sector-carrier allocations.

In some embodiments, the metric is a function of system throughput, energy performance, coverage, and/or quality of service.

In some embodiments, obtaining the actual or predicted channel state information for each of the plurality of wireless devices for each of the plurality of sector-carriers comprises, for at least one of the plurality of wireless devices and at least one of the plurality of sector-carriers, obtaining a predicted channel state information for the at least one of the plurality of wireless devices for the at least one of the plurality of sector-carriers, the predicted channel state information being predicted using model training that is based on live network data.

In some embodiments, obtaining the predicted channel state information for the at least one of the plurality of wireless devices for the at least one of the plurality of sector-carriers comprises coordinating and/or signaling with at least one other network node to train and/or use a model for predicting the channel state information.

In some embodiments, the predicted channel orthogonality is predicted using model training based on live network data. In some embodiments, the predicted channel orthogonality is predicted using model training based on live network data.

In some embodiments, the sector-carrier allocation selected for the plurality of wireless devices is an uplink sector-carrier allocation for the plurality of wireless devices, wherein selection of the uplink sector-carrier allocation for the plurality of wireless devices is decoupled from selection of a downlink sector-carrier allocation for the plurality of wireless devices.

In some embodiments, the sector-carrier allocation selected for the plurality of wireless devices is a downlink sector-carrier allocation for the plurality of wireless devices, wherein selection of the downlink sector-carrier allocation for the plurality of wireless devices is decoupled from selection of an uplink sector-carrier allocation for the plurality of wireless devices.

In some embodiments, the network node is a radio access node. In some embodiments, the plurality of sector-carriers are served by the radio access node. In some other embodiments, the plurality of sector-carriers comprise one or more sector-carriers served by the radio access node and one or more sector-carriers served by one or more other radio access nodes.

In some embodiments, the network node is a core network node, and the plurality of sector-carriers are served by two or more radio access nodes associated with the core network node.

In some embodiments, a network node for a wireless communication system comprises an interface and processing circuitry configured to select a sector-carrier allocation for a plurality of wireless devices on a plurality of sector-carriers in accordance with a MU-MIMO aware sector-carrier allocation procedure that takes into account possible MU-MIMO pairings for the plurality of wireless devices on the plurality of sector-carriers, the sector-carrier allocation comprising a selected sector-carrier for each of the plurality of wireless devices, and provide an indication of the sector-carrier allocation for the plurality of wireless devices to at least a node or set of nodes selected from a group consisting of: another network node and the plurality of wireless devices.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
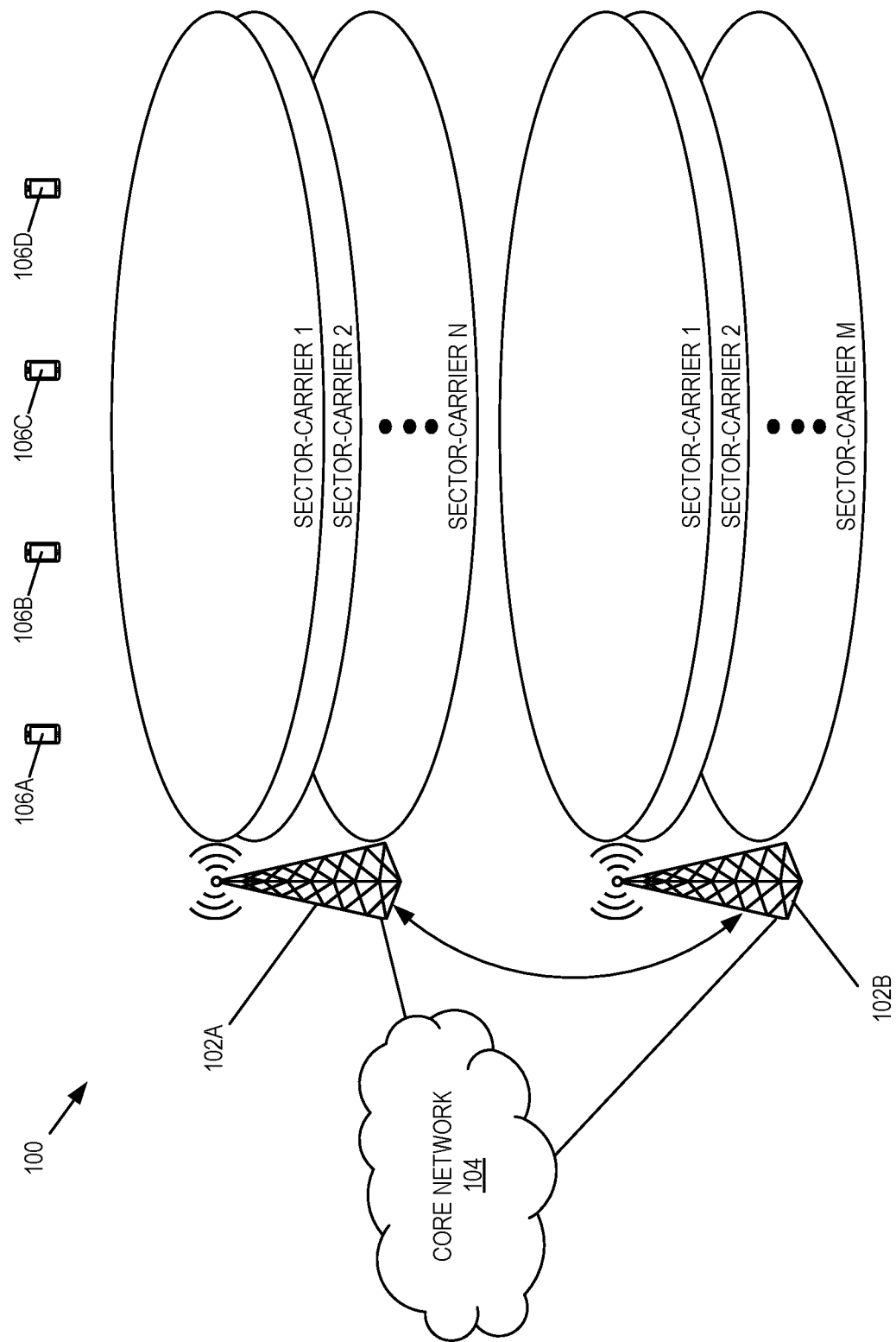
FIG. 1 illustrates a wireless communication system in which a Multi-User Multiple Input Multiple Output (MU-MIMO) aware sector allocation procedure can be implemented in accordance with embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" refers to a device capable, configured, arranged, and/or operable to communicate wirelessly with network nodes and/or other wireless devices. Unless otherwise noted, the term wireless device may be used interchangeably herein with User Equipment device (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a Voice over Internet Protocol (IP) (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A wireless device may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-to-Machine (M2M) device, which may in a 3GPP context be referred to as a Machine-Type Communication (MTC) device. As one particular example, the wireless device may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Network Node: As used herein, a "network node" is any node that is either part of the radio access network or the core network of a cellular communications network/system. In particular, a network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs) and base stations (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Conventional sector-carrier allocation procedures do not consider Multi-User Multiple Input Multiple Output (MU-MIMO) pairing opportunities that could be utilized if one or more wireless devices are moved from one sector-carrier to another sector-carrier. Since MU-MIMO pairing opportunities can increase the capacity of a sector-carrier, sector-carrier allocation procedures without MU-MIMO awareness can result in sub-optimal performance.

Systems and methods relating to a MU-MIMO aware sector-carrier allocation procedure are disclosed. The MU-MIMO aware sector-carrier allocation procedure reallocates a wireless device to a selected sector-carrier in order to improve the MU-MIMO pairing opportunities. In some embodiments, the MU-MIMO aware sector allocation procedure uses channel state information (e.g., channel quality, channel characteristics, or the like) of the wireless device on an already-assigned sector-carrier and predicted channel state information of the wireless device on other un-assigned sector carriers together with predicted channel orthogonality to select the sector-carrier for the wireless device. By utilizing MU-MIMO aware sector-carrier allocation, network capacity can be improved by allocating sector-carriers to wireless devices in such a manner that MU-MIMO gains can be leveraged more effectively.

In this regard, FIG. 1 illustrates a wireless communication system 100 in which a MU-MIMO aware sector allocation procedure can be implemented in accordance with embodiments of the present disclosure. While not being limited thereto, the wireless communication system 100 is configured to operate according to specific standards or other types of predefined rules or procedures. For example, particular embodiments of the wireless communication system 100 may implement communications standards such as LTE or 5G NR. As illustrated, the wireless communication system 100 includes radio access nodes 102A and 102B (generally referred to herein as radio access nodes 102) connected to a core network 104. The radio access nodes 102A and 102B are, in some embodiments, base stations such as, e.g., eNBs or gNBs. The radio access nodes 102A and 102B may also be connected to one another via a communication interface (e.g., an X2 interface). Note that while only two radio access nodes 102A and 102B are illustrated in this example, the wireless communication system 100 may include any number of radio access nodes 102.

The radio access node 102A serves a number (N) of sector-carriers, where N≥1. In a similar manner, the radio access node 102B serves a number (M) of sector-carriers, where M≥1. A number of wireless devices 106A through 106D (generally referred to herein as wireless devices 106) are served by the radio access nodes 102A and 102B. In some embodiments, the radio access nodes 102A and 102B perform a MU-MIMO aware sector-carrier allocation procedure to assign the wireless devices 106A through 106D to the sector-carriers served by the radio access nodes 102A and 102B. In some other embodiments, some other network node(s), such as, e.g., a core network node(s) in the core network 104, performs a MU-MIMO aware sector-carrier allocation procedure to assign the wireless devices 106A through 106D to the sector-carriers served by the radio access nodes 102A and 102B.

Figure 2:
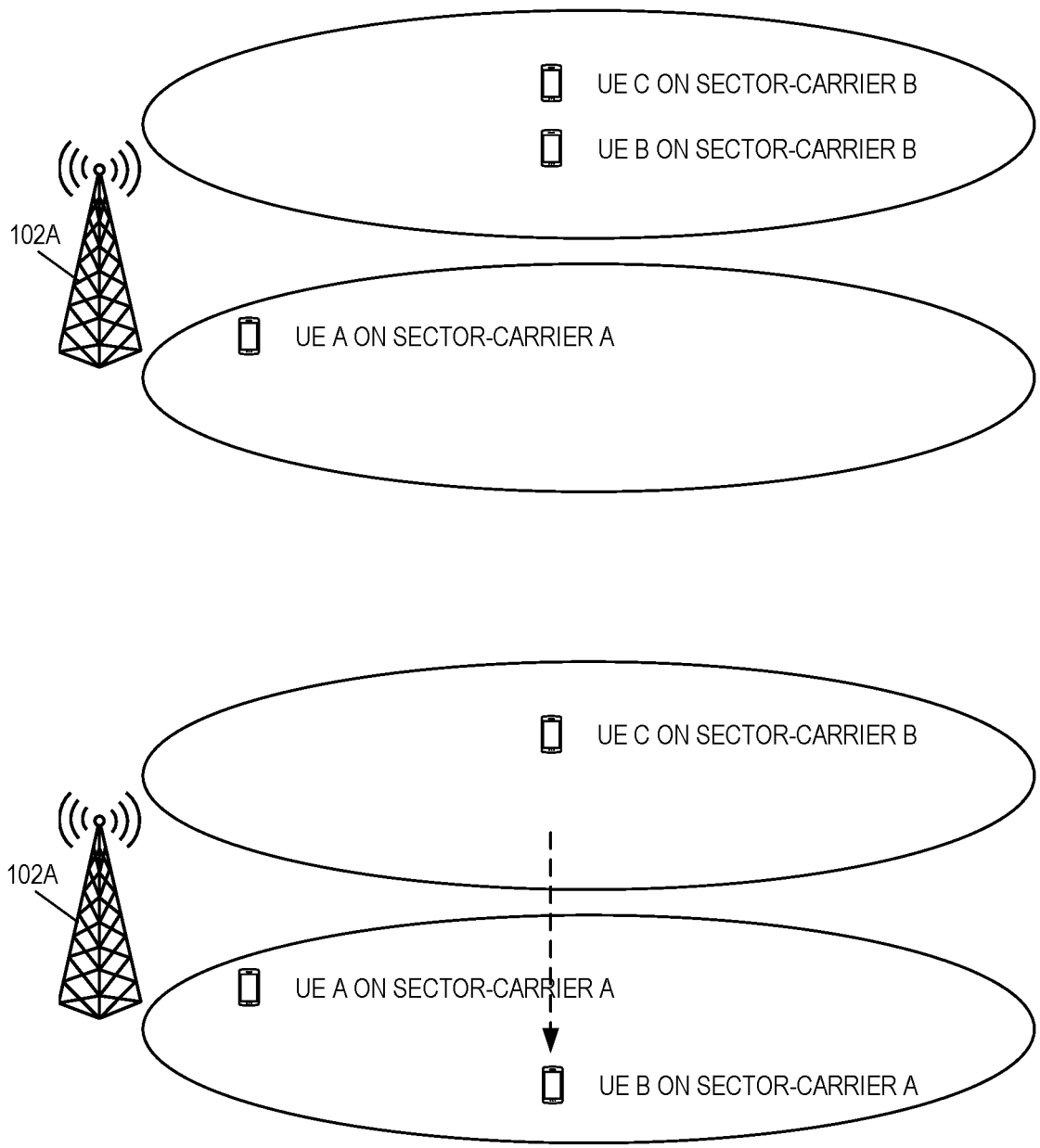
FIG. 2 illustrates an example of the MU-MIMO aware sector-carrier allocation procedure.

FIG. 2 illustrates an example of the MU-MIMO aware sector-carrier allocation procedure. As illustrated, initially, UE A is connected on sector-carrier A of radio access node 102A and UEs B and C are connected on sector-carrier B of the radio access node 102A, as illustrated at the top of FIG. 2. When connected to sector-carrier B, UE B has zero or very little channel orthogonality with UE C, thereby implying no MU-MIMO opportunity in the current sector-carrier. Using the MU-MIMO aware sector-carrier allocation procedure, the radio access node 102A (or alternatively some other network node) would predict the channel state of UE B on sector-carrier A, and deduce that UE B would have good channel orthogonality with UE A if UE B is moved to sector-carrier A. If the predicted gain of moving UE B from sector-carrier B to sector-carrier A would satisfy one or more predefined criteria (e.g., one or more predefined criteria related to network performance), the MU-MIMO aware sector-allocation procedure would result in handover of UE B from sector-carrier B to sector-carrier A, as shown at the bottom of FIG. 2.

As described herein, the MU-MIMO aware sector-carrier allocation procedure is performed by a single network node (e.g., a single radio access node for, e.g., multiple sector-carriers served by that radio access node 102 or a single core network node for multiple sector-carriers served by one or more radio access nodes 102) or performed by two or more network nodes in a distributed manner (e.g., by multiple radio access nodes 102 for, e.g., multiple sector-carriers served by the multiple radio access nodes 102 or by multiple core network nodes for multiple sector-carriers served by multiple radio access nodes 102).

Figure 3:
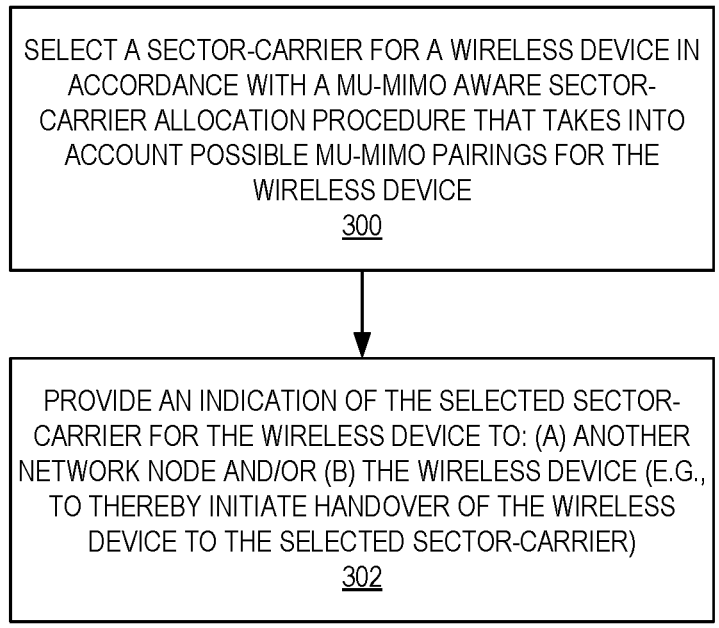
FIG. 3 is a flow chart that illustrates the operation of a network node in accordance with some embodiments of the present disclosure.

In this regard, FIG. 3 is a flow chart that illustrates the operation of a network node (e.g., a radio access node 102 or a core network node) in accordance with some embodiments of the present disclosure. As illustrated, the network node selects a sector-carrier for a wireless device 106 in accordance with a MU-MIMO ware sector-carrier allocation procedure (centralized or distributed) that takes into account possible MU-MIMO pairings for the wireless device 106 (step 300). Note that as used herein a "MU-MIMO pairing" is a pairing of two or more wireless devices 106 for MU-MIMO operation. The network node provides an indication of the selected sector-carrier for the wireless device 106 to another network node and/or to the wireless device 106, depending on the particular embodiment (step 302). In some embodiments, the indication initiates handover of the wireless device 106 from its current sector-carrier to the selected sector-carrier.

Note that while the process of FIG. 3 is described as being performed by the network node, the process may alternatively be performed by two or more network nodes in a distributed manner (e.g., jointly performed by two or more network nodes). For example, one network node may perform some aspects of the process of FIG. 3 (e.g., channel state information prediction and channel orthogonality prediction, as discussed below) and another network node may perform sector-carrier selection (e.g., based on the predicted channel qualities and channel orthogonality). In embodiments in which the MU-MIMO aware sector-allocation procedure is distributed, multiple nodes are involved in the described MU-MIMO aware sector-carrier allocation procedure (radio access nodes 102, wireless devices 106, and possibly control nodes such as, e.g., core network nodes). Accordingly, information is signaled between the various nodes to enable the MU-MIMO aware sector-carrier allocation procedure. In some other embodiments, all sector-carriers belong to the same radio access node 102 and all measurements are local to the radio access node 102. In this case, the MU-MIMO aware sector-carrier allocation procedure can be centralized, e.g., at the radio access node 102.

Further, sector-carrier allocation may be de-coupled for the uplink and downlink (including transmission and/or reception point selection) and/or decoupled for control and data channels. In other words, the sector-carrier allocation procedure may be performed once to select a sector-carrier for both uplink and downlink for both data and control channels, performed separately for uplink and downlink, and/or performed separately for data and control channels.

Figure 4:
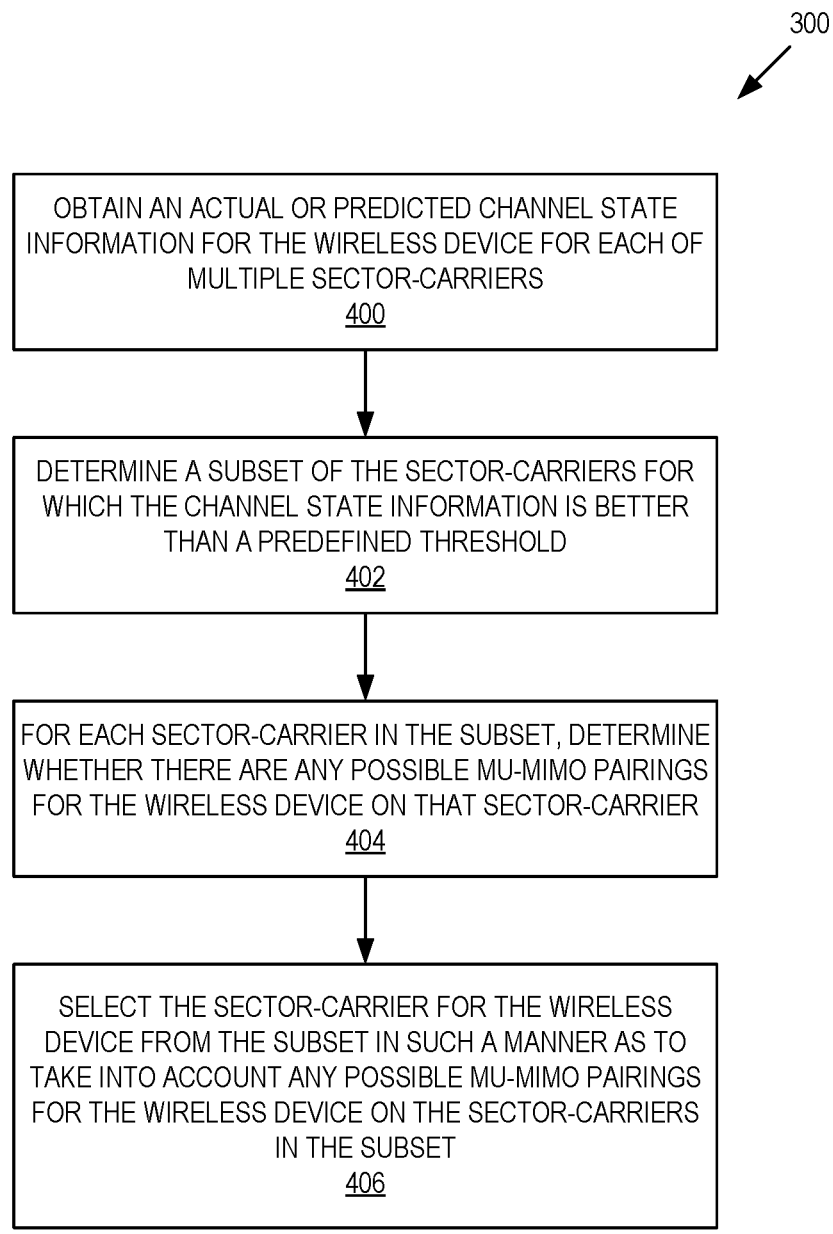
FIG. 4 is a flow chart that illustrates step 300 of FIG. 3 in more detail according to some embodiments of the present disclosure.

FIG. 4 is a flow chart that illustrates step 300 of FIG. 3 in more detail according to some embodiments of the present disclosure. As illustrated, in order to select the sector-carrier for the wireless device 106, the network node obtains an actual or predicted channel state information (e.g., channel quality) for the wireless device 106 for each of multiple sector-carriers (step 400). The network node may obtain the actual or predicted channel qualities based on measurements performed by the network node, obtain the actual or predicted channel qualities from the wireless device 106, obtain the actual or predicted channel qualities from another network node(s), or any combination thereof.

More specifically, in some embodiments, the network node obtains an actual channel state information for the wireless device 106 for the sector-carrier to which the wireless device 106 is currently assigned, e.g., using conventional techniques. The actual channel state information may include, for example, uplink Channel State Information (CSI) and/or downlink CSI. The actual uplink CSI for the wireless device 106 may be estimated by the respective radio access node 102 based on uplink reference signal measurements made by the radio access node 102. If needed, the actual uplink CSI may be provided to another network node. The actual downlink CSI for the wireless device 106 on its currently assigned sector-carrier may be estimated by the wireless device 106 using downlink reference signal measurements, as will be understood by those of skill in the art. The wireless device 106 reports the CSI estimate to the respective radio access node 102. Alternatively, for Time Division Duplexing (TDD) and even for Frequency Division Duplexing (FDD) to some extent, the downlink CSI may be determined by mapping the uplink CSI to the downlink CSI based on channel reciprocity. If needed, the radio access node 102 can provide the CSI estimate to another network node.

In addition to obtaining the actual channel state information for the wireless device 106 on the sector-carrier to which it is currently assigned, the network node obtains a predicted channel state information for the wireless device 106 on each of one or more other sector-carriers to which it may be assigned. These other sector-carriers include other sector-carriers served by the same radio access node 102 serving the assigned sector-carrier and, in some embodiments, sector-carriers served by one or more (e.g., neighboring) radio access nodes 102. The predicted channel state information for wireless device 106 on each of these currently un-assigned sector-carriers may be predicted using any suitable technique. As two non-limiting examples, the predicted channel qualities for the wireless device 106 on the currently un-assigned sector-carriers may be predicted using a channel sounding process and/or by using data analytics of "live" and/or stored or off-line data to "learn" (e.g., via model training) the correlation existing between certain measurements on the assigned sector-carrier and the channel state information on un-assigned sector-carriers. A model used for prediction of the channel state information may be trained or used by more network nodes via coordination and signaling between the network nodes (e.g., coordination and signaling of Radio Resource Management (RRM) measurements).

More specifically, with respect to channel sounding, the network node can initiate a channel sounding process with the wireless device 106 on the un-assigned sector-carriers. This channel sounding process can then be used to estimate or predict the channel state information of the wireless device 106 on the un-assigned sector-carriers. With respect to "learning," measurements performed by wireless devices 106 or by a radio access node(s) 102 while wireless devices 106 are assigned to the different sector-carriers are collected and analyzed to determine correlations between measurements on different sector-carriers. These measurements may be made while the wireless devices 106 are assigned to multiple sector-carriers or just before and/or after the wireless devices 106 are changed from one sector-carrier to another sector-carrier. The measurements may include, for example, location, timing advances, Reference Signal Received Power (RSRP), Channel Quality Indication (CQI), channel estimates, and/or the like, and these measurements can be used and correlated to the channel quality measurements, which may be defined as, for example, RSRP.

The network node determines a subset of the sector-carriers (including both the assigned sector-carrier and the un-assigned sector-carriers) for which the (actual or predicted) channel state information is better than a predefined threshold (step 402). For example, if channel state information is a channel quality represented as an RSRP value, then the network node determines a subset of the sector-carriers for which the (actual or predicted) RSRP value is better than the predefined threshold.

For each sector-carrier in the determined subset, the network node determines whether there are any possible MU-MIMO pairings for the wireless device 106 on that sector-carrier (step 404). More specifically, the network node also obtains actual or predicted channel state information for a number of other wireless devices 106 on the sector-carriers. For each of the subset of sector-carriers, the network node determines which of the other wireless devices 106 also have channel state information that is better than the predefined threshold on that sector-carrier (e.g., a channel quality that is better than the predefined threshold on that sector-carrier). Thus, for each sector-carrier in the subset of sector-carriers, the network node determines a set of other wireless devices 106 that also have good (actual or predicted) channel state information on the sector-carrier. Then, in order to determine whether there are any possible MU-MIMO pairings for the wireless device 106 on a particular sector-carrier in the subset, the network node determines a (actual or predicted) channel orthogonality on the sector-carrier between each possible combination of: (a) the wireless device 106 for which sector-carrier selection is being performed and (b) one or more of the other wireless devices 106 that also have good (actual or predicted) channel state information on the sector-carrier. The combinations for which the channel orthogonality satisfies one or more predefined criteria indicative of "good" channel orthogonality are determined to be possible MU-MIMO pairings for the wireless device 106 on the sector-carrier. The channel orthogonality may be predicted by using data analytics of "live" and/or stored or off-line data to "learn" (e.g., via model training). A model used for prediction of the channel orthogonality may be trained or used by more network nodes via coordination and signaling between the network nodes (e.g., coordination and signaling of RRM measurements). Note that the network node may determine the channel orthogonality locally, obtain the channel orthogonality from another network node, or some combination thereof.

As an example, if the wireless device 106 for which sector-carrier selection is being performed is the wireless device 106A and the other wireless devices 106 that also have good channel state information on the sector-carrier are wireless devices 106B and 106C, then the network node determines a predicted channel orthogonality on the sector-carrier between the wireless device 106A and the wireless device 106B and between the wireless device 106A and the wireless device 106C. In addition, since a MU-MIMO pairing may include more than two wireless devices 106, the network node also determines a predicted channel orthogonality on the sector-carrier between the wireless devices 106A, 106B, and 106C. The combinations for which the channel orthogonality satisfies one or more predefined criteria indicative of "good" channel orthogonality are determined to be possible MU-MIMO pairings for the wireless device 106 on the sector-carrier.

The channel orthogonality between a group of two or more wireless devices 106 may be determined using any suitable mechanism. For example, In environments with strong Line-of-Sight (LoS) component (as often modeled using large Rician factor (K)), or with small channel angular spread, predicted channel orthogonality can be inferred by the angular separation of the UEs estimated using uplink receive Angle-of-Arrival (AoA); or "optimal" downlink transmit Angle-of-Departure (AoD) as feedback by the wireless device 106.

In a more dispersive environment, predicted channel orthogonality can be inferred by certain measurements (location, Precoding Matrix Indicator (PMI), channel estimates, AoA, angular spread, timing advances, etc.) on the active wireless device—sector-carrier assignments given data analytics of prior observations of those measurements and the resulting orthogonality of the channels (e.g., by machine learning).

As one example, each sector-carrier may support two or more beams. The channel orthogonality between two or more wireless devices 106 on the sector-carrier may then be determined as a probability that each of the two or more wireless devices 106 will be served by a different beam on the sector-carrier. If this probability is greater than a predefined threshold, then the channel orthogonality between the two or more wireless devices 106 is determined to be "good" and, as such, the two or more wireless devices 106 are determined to be a possible MU-MIMO pairing on the sector-carrier.

Once the possible MU-MIMO pairings for the wireless device 106 are determined, the network node selects the sector-carrier for the wireless device 106 from the subset of sector-carriers on which the wireless device 106 has good channel state information in such as manner as to take into account any possible MU-MIMO parings for the wireless device 106 on the sector-carriers in the subset of sector-carriers (step 406). More specifically, in some embodiments, a gain resulting from changing the sector-carrier assigned for the wireless device 106 is compared to a gain threshold, over a given time interval (hysteresis), to establish if the wireless device 106 should be assigned to a particular sector-carrier. A sector-carrier for which the gain exceeds the threshold sector-carrier is selected as the sector-carrier for the wireless device 106. The gain is with respect to one or more Key Performance Indictors (KPIs) of the wireless communication system 100, which can be mapped to a function of multiple factors such as power consumption, data throughput, radio resource usage, latency (perceived throughput), coverage, quality of service flow requirements (e.g., latency and/or guaranteed bit rate), and/or the like. Load may also be considered. Cellular networks usually rely on a load balancing functionality to make sure that certain sector-carriers do not end up being too overloaded when others are not very loaded and could provide adequate link conditions. As such, maximizing link quality and MU-MIMO opportunities is not the only factor; having good channels and orthogonality is beneficial, but it is also important that enough radio resources are available so that they can be allocated to the wireless device 106.

Figure 5:
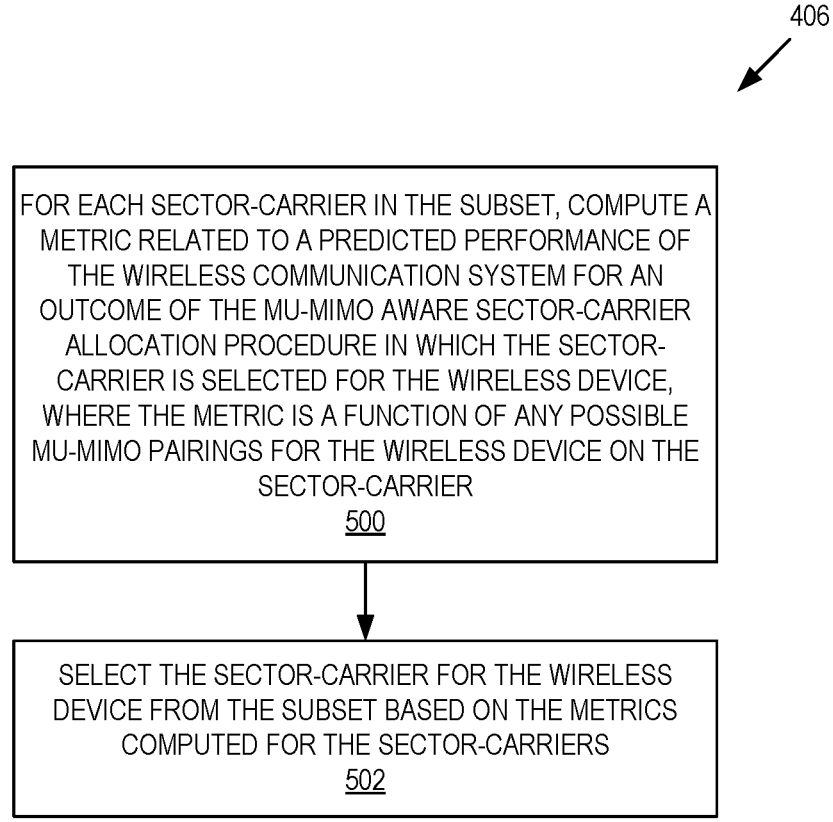
FIG. 5 is a flow chart that illustrates step 406 of FIG. 4 in more detail according to some embodiments of the present disclosure.

FIG. 5 illustrates the selection step (i.e., step 406) of FIG. 4 in more detail according to some embodiments of the present disclosure. As illustrated, for each sector-carrier in the subset of sector-carriers for which the channel state information of the wireless device 106 is good, the network node computes a metric related to a predicted performance of the wireless communication system 100 for an outcome of the MU-MIMO aware sector-carrier allocation procedure in which the sector-carrier is selected for the wireless device 106 (step 500). The metric is a function of any possible MU-MIMO pairings for the wireless device 106 on the sector-carrier. The metric may be, for example, power consumption, data throughput, radio resource usage, latency, coverage, normalized bandwidth (bandwidth normalized with respect to the effective number of competing wireless devices 106), or the like, or any combination thereof. The network node selects the sector-carrier for the wireless device 106 from the subset of sector-carriers based on the metrics computed for the sector-carriers (step 502). For example, the sector-carrier having the best metric (e.g., lowest power consumption, highest data throughput, lowest resource usage, lowest latency, highest coverage, or highest normalized bandwidth) is selected as the sector-carrier for the wireless device 106. Note that, in some embodiments, factors other than the metrics may also be taken into account in step 502. For example, the network node may select the sector-carrier for the wireless device 106 based on the metrics and one or more additional factors (e.g., load).

Figure 6:
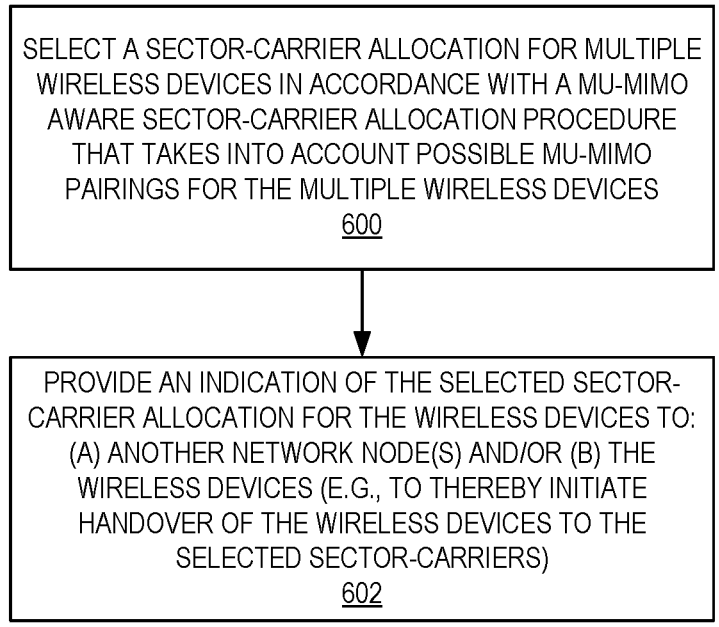
FIG. 6 is a flow chart that illustrates a process in which sector-carriers for multiple wireless devices are selected in accordance with some embodiments of the present disclosure.

While the discussion of FIGS. 3 through 5 have focused on the selection of a sector-carrier for a particular wireless device 106, FIG. 6 illustrates a process in which sector-carriers for multiple wireless devices 106 are selected in accordance with some embodiments of the present disclosure. As illustrated, a network node selects a sector-carrier allocation for multiple wireless devices 106 in accordance with a MU-MIMO sector-carrier allocation procedure that takes into account possible MU-MIMO pairings for the multiple wireless devices 106 (step 600). The network node provides an indication of the selected sector-carriers for the wireless devices 106 to one or more other network nodes and/or to the wireless devices 106, depending on the particular embodiment (step 602). In some embodiments, the indication initiates handover of the wireless devices 106 from their current sector-carriers to the selected sector-carriers.

Note that while the process of FIG. 6 is described as being performed by the network node, the process may alternatively be performed by two or more network nodes in a distributed manner. For example, one network node may perform some aspects of the process of FIG. 6 (e.g., channel state information prediction and channel orthogonality prediction, as discussed below) and another network node may perform sector-carrier selection (e.g., based on the predicted channel qualities and channel orthogonality). Further, sector-carrier allocation may be de-coupled for the uplink and downlink (including transmission and/or reception point selection) and/or decoupled for control and data channels. In other words, the sector-carrier allocation procedure may be performed once to select a sector-carrier for both uplink and downlink for both data and control channels, performed separately for uplink and downlink, and/or performed separately for data and control channels.

Figure 7:
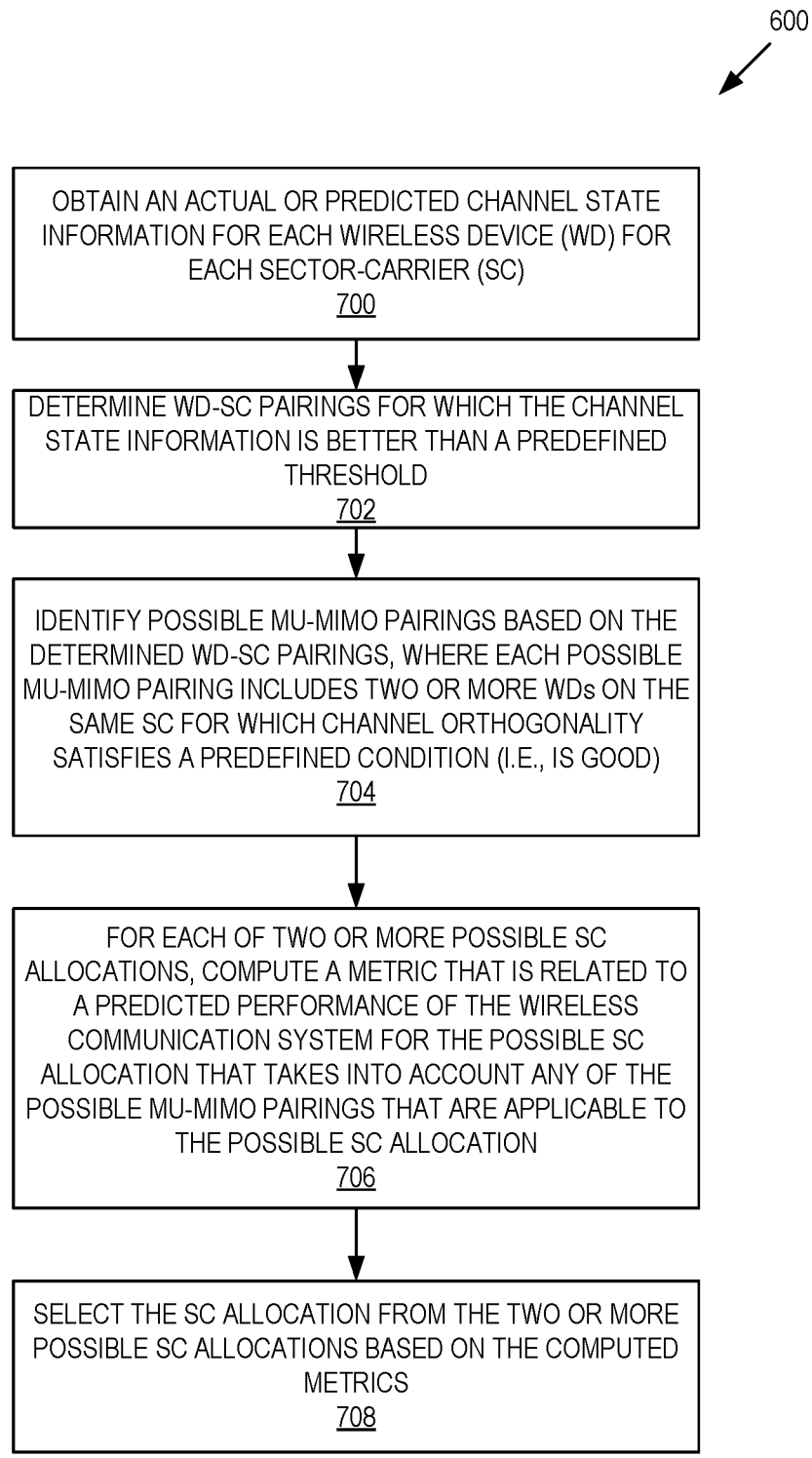
FIG. 7 is a flow chart that illustrates step 600 of FIG. 6 in more detail according to some embodiments of the present disclosure.

FIG. 7 is a flow chart that illustrates step 600 of FIG. 6 in more detail according to some embodiments of the present disclosure. As illustrated, in order to select the sector-carriers for the wireless devices 106, the network node obtains actual or predicted channel state information (e.g., actual or predicted channel quality) for each wireless device 106 for each of multiple sector-carriers (step 700). The network node may obtain the actual or predicted channel qualities based on measurements performed by the network node, obtain the actual or predicted channel qualities from the wireless devices 106, obtain the actual or predicted channel qualities from another network node(s), or any combination thereof.

More specifically, in some embodiments, the network node obtains actual channel state information for each of the wireless devices 106 for the sector-carriers to which the wireless devices 106 are currently assigned, e.g., using conventional techniques. The actual channel state information may include, for example, uplink CSI and/or downlink CSI. In addition to obtaining the actual channel state information for each wireless device 106 on the sector-carrier to which it is currently assigned, the network node obtains predicted channel state information for each wireless device 106 on each of one or more other sector-carriers to which it may be assigned. These other sector-carriers include other sector-carriers served by the same radio access node 102 serving the assigned sector-carrier and, in some embodiments, sector-carriers served by one or more (e.g., neighboring) radio access nodes 102. As discussed above with respect to step 402, the predicted channel state information for each wireless device 106 on each of the currently un-assigned sector-carriers may be predicted using any suitable technique. As two non-limiting examples, the predicted channel qualities for the wireless devices 106 on the currently un-assigned sector-carriers may be predicted using a channel sounding process and/or by using data analytics to "learn" the correlation existing between certain measurements on the assigned sector-carriers and the channel state information on un-assigned sector-carriers. More specifically, with respect to channel sounding, the network node can initiate a channel sounding process with the wireless devices 106 on the un-assigned sector-carriers. This channel sounding process can then be used to estimate or predict the channel state information of the wireless devices 106 on the un-assigned sector-carriers. With respect to "learning," measurements performed by wireless devices 106 or by a radio access node(s) 102 while the wireless devices 106 are assigned to the different sector-carriers are collected and analyzed to determine correlations between measurements on different sector-carriers. These measurements may be made while the wireless devices 106 are assigned to multiple sector-carriers or just before and/or after the wireless devices 106 are changed from one sector-carrier to another sector-carrier. The measurements may include, for example, location, timing advances, RSRP, CQI, channel estimates, and/or the like, and these measurements can be used and correlated to the channel state information measure, which may be defined as, for example, RSRP.

The network node determines Wireless Device-Sector-Carrier (WD-SC) pairings for which the (actual or predicted) channel state information is better than a predefined threshold (step 702). Each WD-SC pairing includes one wireless device 106 and one sector-carrier. In other words, for each wireless device 106, the network node determines the sector-carriers for which the channel state information of the wireless device 106 is better than the predefined threshold. Those sector-carriers together with the wireless device 106 form WD-SC pairings for which the channel state information is better than the predefined threshold.

The network node identifies possible MU-MIMO pairings based on the determined WD-SC pairings having channel qualities that are better than the predefined threshold (step 704). Each possible MU-MIMO pairing includes two or more wireless devices 106 on the same sector-carrier for which channel orthogonality satisfies one or more predefined conditions that are indicative of "good" channel orthogonality between the two or more wireless devices 106 on the sector carrier. More specifically, in order to identify any possible MU-MIMO pairings, for each sector-carrier, the network node determines a channel orthogonality on the sector-carrier between each possible combination of the WD-SC pairings for that sector-carrier. The combinations for which the channel orthogonality satisfies one or more predefined criteria indicative of "good" channel orthogonality are determined to be possible MU-MIMO pairings on the sector-carrier.

The channel orthogonality between a group of two or more wireless devices 106 on the same sector-carrier, which are represented by respective WD-SC pairings, may be determined by the network node and/or by another network node(s) using any suitable mechanism. For example:

In environments with strong LoS component (as often modeled using large Ricean factor (K)), or with small channel angular spread, predicted channel orthogonality can be inferred by the angular separation of the UEs estimated using:
uplink receive AoA; or
"optimal" downlink transmit AoD as feedback by the wireless device 106.

In a more dispersive environment, predicted channel orthogonality can be inferred by certain measurements (location, PMI, channel estimates, AoA, angular spread, timing advances, etc.) on the active WD-SC assignments given data analytics of prior observations of those measurements and the resulting orthogonality of the channels (e.g., by machine learning).

As one example, each sector-carrier may support two or more beams. The channel orthogonality between two or more wireless devices 106 on the sector-carrier may then be determined as a probability that each of the two or more wireless devices 106 will be served by a different beam on the sector-carrier. If this probability is greater than a predefined threshold, then the channel orthogonality between the two or more wireless devices 106 is determined to be "good" and, as such, the two or more wireless devices 106 are determined to be a possible MU-MIMO pairing on the sector-carrier.

Once the possible MU-MIMO pairings for the wireless device 106 are determined, the network node computes a metric that is related to a predicted performance of the wireless communication system 100 for each of two or more possible sector-carrier allocations for the multiple wireless devices 106 (step 706). In this context, a sector-carrier allocation for the multiple wireless devices 106 assigns a sector-carrier to each of the multiple wireless devices 106. The metric takes into account any of the possible MU-MIMO pairings that are applicable to the possible sector-carrier allocation.

The metric may be a gain with respect to one or more KPIs of the wireless communication system 100, which can be mapped to a function of multiple factors such as power consumption, data throughput, radio resource usage, latency (perceived throughput), coverage, and/or the like. As another example, the metric may be, for example, power consumption, data throughput, radio resource usage, latency, coverage, normalized bandwidth (bandwidth normalized with respect to the effective number of competing wireless devices 106), or the like, or any combination thereof. The network node selects one of the two or more possible sector-carrier allocations as the sector-carrier allocation for the wireless devices 106 based on the computed metrics for the possible sector-carrier allocations (step 708). For example, the sector-carrier allocation having the best metric (e.g., lowest power consumption, highest data throughput, lowest resource usage, lowest latency, highest coverage, or highest normalized bandwidth) is selected as the sector-carrier allocation for the wireless devices 106. Note that, in some embodiments, factors other than the metrics may also be taken into account in step 708. For example, the network node may select the sector-carrier allocation for the wireless devices 106 based on the metrics and one or more additional factors (e.g., load).

Figure 8:
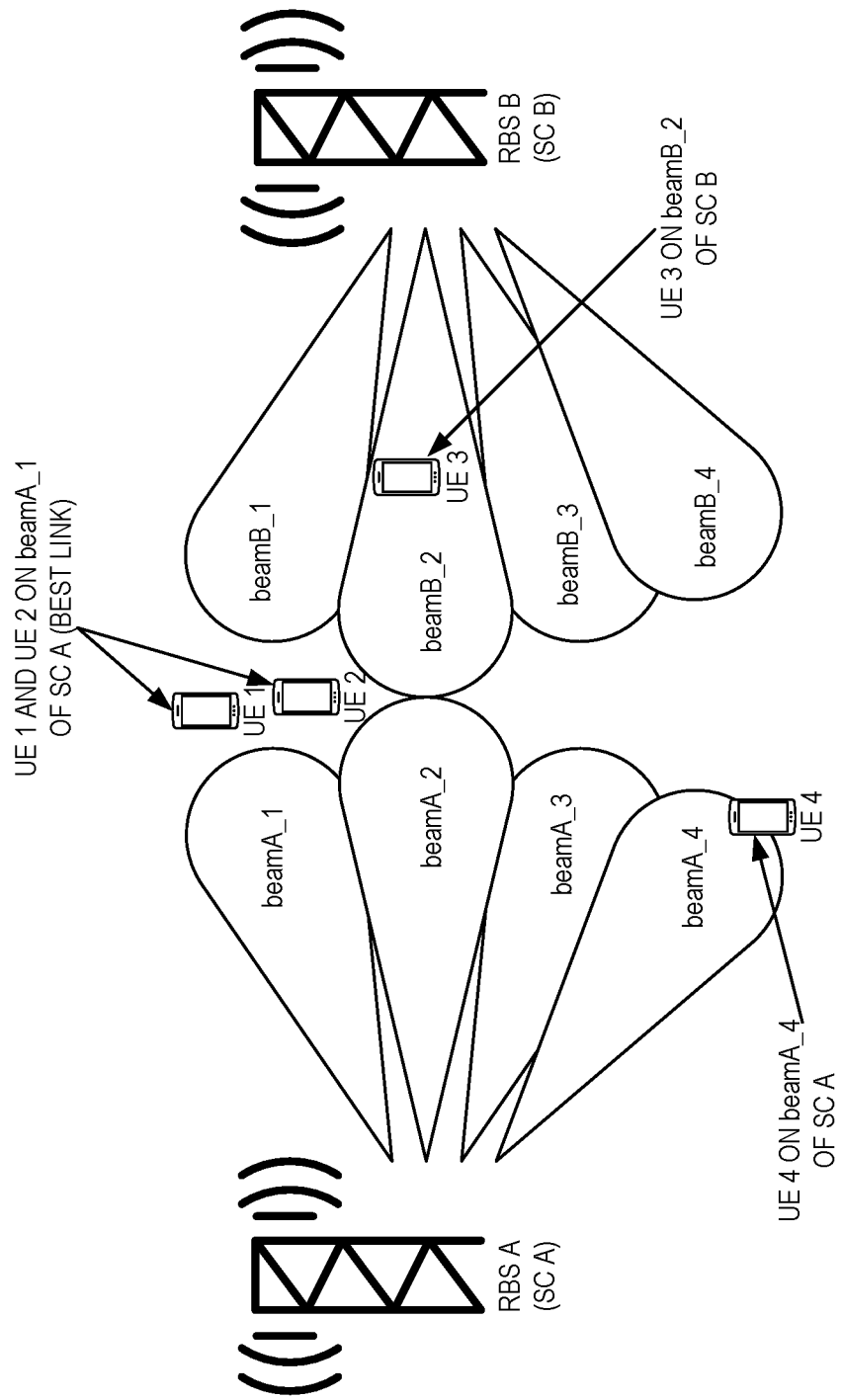
FIGS. 8 and 9 illustrate on specific example of a MU-MIMO aware sector-carrier allocation procedure.

One example embodiment will now be described with respect to FIGS. 8 and 9. This example embodiment relates to feedback-based precoder-based beamforming with strong LoS. In this example embodiment, two radio access nodes or radio base stations RBS A and RBS B are considered. RBS A is responsible for sector-carrier A (SC A) and RBS B is responsible for sector-carrier B (SC B). The two radio access nodes are connected via a coordination interface, and can exchange coordination messages over that interface.

During initialization, or whenever configuration changes happen, the two radio access nodes communicate with each other to establish a common understanding of the "spatial resource numbering" and MU-MIMO multiplexing capabilities. For example, the following understanding may be established:

SC A has four spatial resources or beams, namely, beamA_1, beamA_2, beamA_3, and beamA_4. SC A's MU-MIMO multiplexing capability (i.e., the number of simultaneous MU-MIMO transmissions) is 2.

SC B has four spatial resources or beams, namely, beamB_1, beamB_2, beamB_3, and beamB_4. SC B's MU-MIMO multiplexing capability is 2.

During initial sector-carrier selection, each wireless device (referred to here as UE) is allocated with a sector-carrier that provides the best communication link in terms of channel quality/signal strength. In this example, as illustrated in FIG. 8, UE 1 and UE 2 are allocated with SC A as they have the best communication link in beamA_1 of SC A. Similarly, UE 3 is spatially located such that it has the best communication link in beamB_2 of SC B, and thus is allocated with SC B. UE 4 sees the best communication link in beamA_4 in SC A and thus is allocated with SC A.

UE 1 and UE 2 cannot be multiplexed spatially (i.e., cannot form a MU-MIMO pair) since both are in the same beam of SC A, and thus do not have the required channel orthogonality. UEs which are not multiplexed spatially on time-frequency resources for which MU-MIMO is performed need to be multiplexed in time/frequency and/or code. In other words, the communication bandwidth of SC A has to be shared between UE 1 and UE 2. But since UE 4 is in a different beam, one possible way of sharing the bandwidth could be using two MU-MIMO pairs: UE 1+UE 4 and UE 2+UE 4. In other words, there are two sets of user groups that compete for the communication bandwidth in time/frequency and/or code. This is referred to herein as the "effective number of competing users." In SC B, given that there is only one UE, no MU-MIMO pairing is possible.

When information is updated, the RBSs exchange, among other things, a load-vector indexed by the spatial resources using the coordination interface. For example, RBS A sends {SC_A: {beamA_1=2, beamA_2=0; beamA_3=0; beamA_4=1}, SC_A_BW: 20 MHz}, and RBS B sends {SC_B: {beamB_1=0, beamB_2=1; beamB_3=0; beamB_4=0}, SC_B_BW: 20 MHz}.

RBS A employs a mechanism with which it can identify the likelihood that a UE in SC_A would occupy spatial resource beamB_i in SC B based on its reported CSI, including PMI. The output of such an algorithm can be a simple table as shown in Table 1 below.

TABLE 1

Example illustration of the likelihood table. Each row represents the probability that a UE with a certain CSI (in this case represented using PMI only) in Sc A can be in beam_i in Sc B. Various approaches can be taken to infer such a table including either an analytical approach or machine learning.

| | Probability in Beam_1/ SC_B | Probability in Beam_2/ SC_B | Probability in Beam_3/ SC_B | Probability in Beam_4/ SC_B |
|---|---|---|---|---|
| PMI index = {1, . . . , 4} SC_A | 0.8 | 0.15 | 0.03 | 0.02 |
| PMI index = {5, . . . , 8} SC_A | 0.2 | 0.6 | 0.15 | 0.05 |
| PMI index = {9, . . . 12} SC_A | 0.05 | 0.15 | 0.6 | 0.2 |
| PMI index = {13 . . . 16} SC_A | 0.02 | 0.03 | 0.15 | 0.8 |

RBS A moves a UE to SC B if there is, for example, an overall gain in network capacity (or some other criteria). As an example, the calculations for UE 2 can happen as follows:

UE 2, assuming it reported PMI index=1, would occupy beamB_1 in SC B with a probability of 0.8, beamB_2 in SC B with probability of 0.15, beamB_3 in SC B with probability 0.03, and beamB_4 in SC B with probability 0.02.

Given the load vector in SC B {beam1=0, beam2=1; beam3=0; beam4=0}, RBS A can compute MU-MIMO opportunities (and thus the effective number of competing users) if UE 2 is moved to SC B as follows:

In SC A:
UE 1 and UE 4 can form one MU-MIMO pair and thus the effective number of competing users would reduce to 1.

In SC B:
UE 2 could be paired with the only UE in beamB_2 (i.e., UE 3) with a probability of (1−0.15)=0.85. In this case, the number of MU-MIMO pairs, and the "effective number of competing users" in SC B would remain at 1.

UE 2 could be in beamB_2 with a probability of 0.15, and thus not offer any MU-MIMO pairing opportunity. In this case, the effective number of competing users in SC B would increase to 2.

The expected value of the effective number of competing users in SC B can be estimated, for example, as 0.85×1+0.15×2=1.15.

This can be translated to a throughput metric. An example based on normalized bandwidth is presented in Table 2 below.

TABLE 2

Calculation of throughput gains in determining if UE 2 is to be moved to SC B or not.

| | | Scenario 1: UE 2 remains at SC A | Scenario 2: UE 2 is moved to SC B |
|---|---|---|---|
| Normalized bandwidth = $\left(\dfrac{\text{bandwidth}}{\text{effective number of competing users}}\right)$ | SC A SC B | 20 MHz/2 20 MHz/1 | 20 MHz/1 20 MHz/ 1.15 |
| | Total | 30 MHz | 37.39 MHz |

Figure 9:
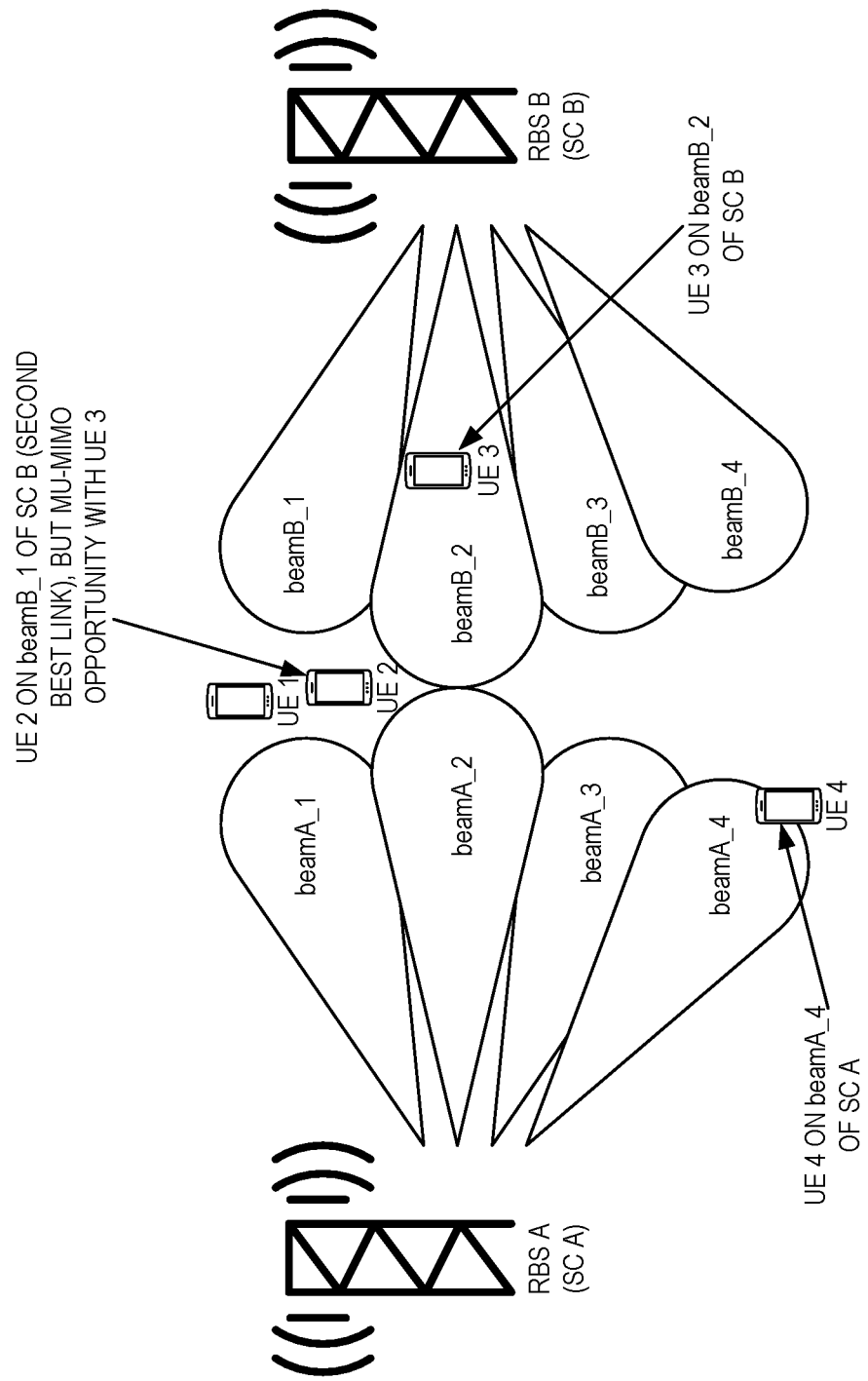

If the increase in performance gain (37.39−30=7.39 megahertz (MHz)) exceeds a predefined threshold, UE 2 is moved to SC B as illustrated in FIG. 9.

Figure 10:
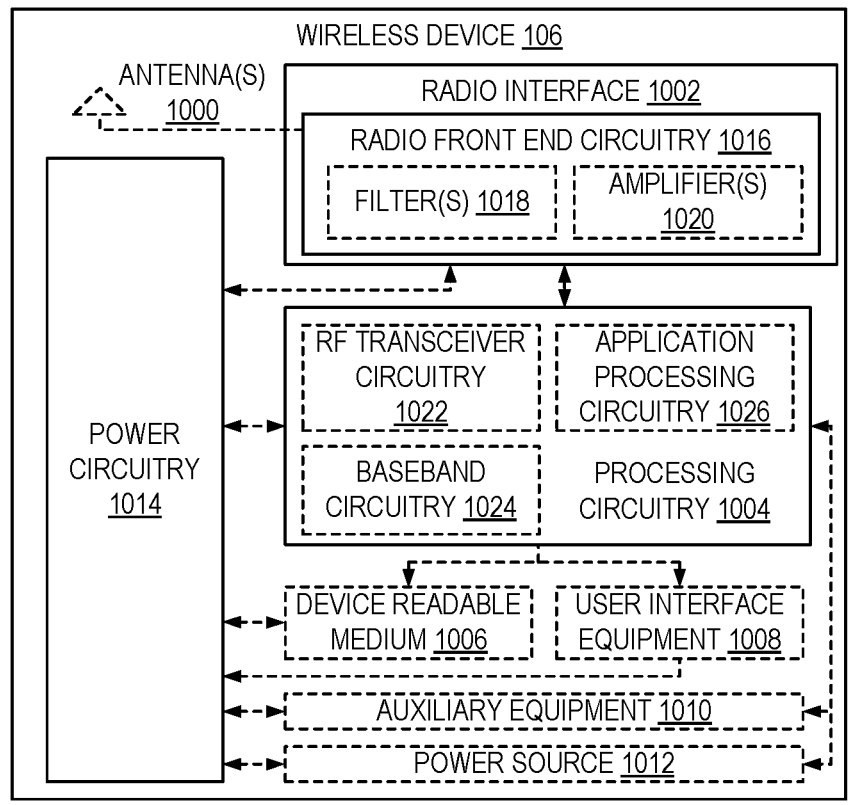
FIGS. 10 and 11 illustrate example embodiments of a wireless device.

FIG. 10 illustrates one example of a wireless device 106 in accordance with some embodiments of the present disclosure. The wireless device 106 includes various components described in more detail below. These components work together in order to provide wireless device functionality, such as providing wireless connections in a wireless network.

As illustrated, the wireless device 106 includes one or more antennas 1000, a radio interface 1002, processing circuitry 1004, a device readable medium 1006, user interface equipment 1008, auxiliary equipment 1010, a power source 1012, and power circuitry 1014. The wireless device 106 may include multiple sets of one or more of the illustrated components for different wireless technologies supported by the wireless device 106, such as, for example, Global System for Mobile Communications (GSM), Wideband Code Division Multiple Access (WCDMA), LTE, NR, WiFi, Worldwide Interoperability for Microwave Access (WiMAX), or Bluetooth wireless technologies, just to mention a few. These wireless technologies may be integrated into the same or different chips or set of chips as other components within the wireless device 106.

The antenna(s) 1000 may include one or more antennas or antenna arrays configured to send and/or receive wireless signals and is connected to the radio interface 1002. In certain alternative embodiments, the antenna(s) 1000 may be separate from the wireless device 106 and be connectable to the wireless device 106 through an interface or port. The antenna(s) 1000, the radio interface 1002, and/or the processing circuitry 1004 may be configured to perform any receiving or transmitting operations described herein as being performed by the wireless device 106. Any information, data, and/or signals may be received from a network node and/or another wireless device 106. In some other embodiments, the antenna(s) 1000 may be part of the radio interface 1002.

As illustrated, the radio interface 1002 comprises radio front end circuitry 1016 and, in some alternative embodiments, the antenna(s) 1000. The radio front end circuitry 1016 comprises one or more filters 1018 and amplifiers 1020. The radio front end circuitry 1016 is connected to the antenna(s) 1000 and the processing circuitry 1004 and is configured to condition signals communicated between the antenna(s) 1000 and the processing circuitry 1004. The radio front end circuitry 1016 may be coupled to or be a part of the antenna(s) 1000. In some embodiments, the wireless device 106 may not include separate radio front end circuitry 1016; rather, the processing circuitry 1004 may comprise radio front end circuitry and may be connected to the antenna(s) 1000. Similarly, in some embodiments, some or all of Radio Frequency (RF) transceiver circuitry 1022 may be considered a part of the radio interface 1002. The radio front end circuitry 1016 may receive digital data that is to be sent out to other network nodes or wireless devices 106 via a wireless connection. The radio front end circuitry 1016 may convert the digital data into a radio signal having the appropriate channel and bandwidth parameters using a combination of the filters 1018 and/or the amplifiers 1020. The radio signal may then be transmitted via the antenna(s) 1000. Similarly, when receiving data, the antenna(s) 1000 may collect radio signals which are then converted into digital data by the radio front end circuitry 1016. The digital data may be passed to the processing circuitry 1004. In other embodiments, the radio interface 1002 may comprise different components and/or different combinations of components.

The processing circuitry 1004 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other wireless device 106 components, such as the device readable medium 1006, wireless device 106 functionality. Such functionality may include providing any of the various wireless features or benefits discussed herein. For example, the processing circuitry 1004 may execute instructions stored in the device readable medium 1006 or in memory within the processing circuitry 1004 to provide the functionality disclosed herein.

As illustrated, the processing circuitry 1004 includes one or more of the RF transceiver circuitry 1022, baseband processing circuitry 1024, and application processing circuitry 1026. In other embodiments, the processing circuitry 1004 may comprise different components and/or different combinations of components. In certain embodiments, the processing circuitry 1004 of the wireless device 106 may comprise a System on a Chip (SOC). In some embodiments, the RF transceiver circuitry 1022, the baseband processing circuitry 1024, and the application processing circuitry 1026 may be on separate chips or sets of chips. In alternative embodiments, part or all of the baseband processing circuitry 1024 and the application processing circuitry 1026 may be combined into one chip or set of chips, and the RF transceiver circuitry 1022 may be on a separate chip or set of chips. In still alternative embodiments, part or all of the RF transceiver circuitry 1022 and the baseband processing circuitry 1024 may be on the same chip or set of chips, and the application processing circuitry 1026 may be on a separate chip or set of chips. In yet other alternative embodiments, part or all of the RF transceiver circuitry 1022, the baseband processing circuitry 1024, and the application processing circuitry 1026 may be combined in the same chip or set of chips. In some embodiments, the RF transceiver circuitry 1022 may be a part of the interface radio interface 1002. The RF transceiver circuitry 1022 may condition RF signals for the processing circuitry 1004.

In certain embodiments, some or all of the functionality described herein as being performed by a wireless device 106 may be provided by the processing circuitry 1004 executing instructions stored on the device readable medium 1006, which in certain embodiments may be a computer-readable storage medium. In alternative embodiments, some or all of the functionality may be provided by the processing circuitry 1004 without executing instructions stored on a separate or discrete device readable storage medium, such as in a hard-wired manner. In any of those particular embodiments, whether executing instructions stored on a device readable storage medium or not, the processing circuitry 1004 can be configured to perform the described functionality. The benefits provided by such functionality are not limited to the processing circuitry 1004 alone or to other components of the wireless device 106, but are enjoyed by the wireless device 106 as a whole, and/or by end users and the wireless network generally.

The processing circuitry 1004 may be configured to perform any determining, calculating, or similar operations (e.g., certain obtaining operations) described herein as being performed by a wireless device 106. These operations, as performed by the processing circuitry 1004, may include processing information obtained by the processing circuitry 1004 by, for example, converting the obtained information into other information, comparing the obtained information or converted information to information stored by the wireless device 106, and/or performing one or more operations based on the obtained information or converted information, and as a result of said processing making a determination.

The device readable medium 1006 may be operable to store a computer program; software; an application including one or more of logic, rules, code, tables, etc.; and/or other instructions capable of being executed by the processing circuitry 1004. The device readable medium 1006 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by the processing circuitry 1004. In some embodiments, the processing circuitry 1004 and the device readable medium 1006 may be considered to be integrated.

The user interface equipment 1008 may provide components that allow for a human user to interact with the wireless device 106. Such interaction may be of many forms, such as visual, audial, tactile, etc. The user interface equipment 1008 may be operable to produce output to the user and to allow the user to provide input to the wireless device 106. The type of interaction may vary depending on the type of user interface equipment 1008 installed in the wireless device 106. For example, if the wireless device 106 is a smart phone, the interaction may be via a touch screen; if the wireless device 106 is a smart meter, the interaction may be through a screen that provides usage (e.g., the number of gallons used) or a speaker that provides an audible alert (e.g., if smoke is detected). The user interface equipment 1008 may include input interfaces, devices, and circuits, and output interfaces, devices, and circuits. The user interface equipment 1008 is configured to allow input of information into the wireless device 106, and is connected to the processing circuitry 1004 to allow the processing circuitry 1004 to process the input information. The user interface equipment 1008 may include, for example, a microphone, a proximity or other sensor, keys/buttons, a touch display, one or more cameras, a Universal Serial Bus (USB) port, or other input circuitry. The user interface equipment 1008 is also configured to allow output of information from the wireless device 106 and to allow the processing circuitry 1004 to output information from the wireless device 106. The user interface equipment 1008 may include, for example, a speaker, a display, vibrating circuitry, a USB port, a headphone interface, or other output circuitry. Using one or more input and output interfaces, devices, and circuits of the user interface equipment 1008, the wireless device 106 may communicate with end users and/or the wireless network and allow them to benefit from the functionality described herein.

The auxiliary equipment 1010 is operable to provide more specific functionality which may not be generally performed by wireless devices. This may comprise specialized sensors for doing measurements for various purposes, interfaces for additional types of communication such as wired communications, etc. The inclusion and type of components of the auxiliary equipment 1010 may vary depending on the embodiment and/or scenario.

The power source 1012 may, in some embodiments, be in the form of a battery or battery pack. Other types of power sources, such as an external power source (e.g., an electricity outlet), photovoltaic devices, or power cells may also be used. The wireless device 106 may further comprise the power circuitry 1014 for delivering power from the power source 1012 to the various parts of the wireless device 106 which need power from the power source 1012 to carry out any functionality described or indicated herein. The power circuitry 1014 may in certain embodiments comprise power management circuitry. The power circuitry 1014 may additionally or alternatively be operable to receive power from an external power source, in which case the wireless device 106 may be connectable to the external power source (such as an electricity outlet) via input circuitry or an interface such as an electrical power cable. The power circuitry 1014 may also in certain embodiments be operable to deliver power from an external power source to the power source 1012. This may be, for example, for the charging of the power source 1012. The power circuitry 1014 may perform any formatting, converting, or other modification to the power from the power source 1012 to make the power suitable for the respective components of the wireless device 106 to which power is supplied.

Figure 11:
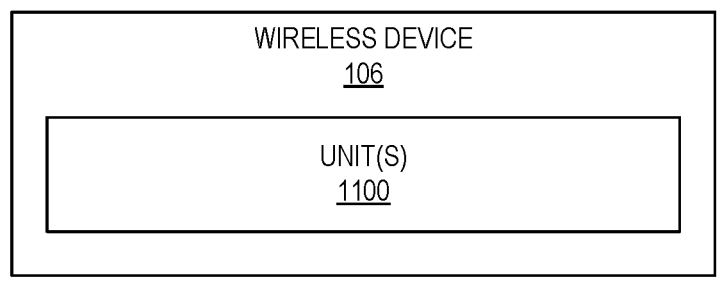

FIG. 11 illustrates the wireless device 106 in accordance with some other embodiments of the present disclosure. Here, the wireless device 106 is a "virtual apparatus." The wireless device 106 is operable to carry out the functionality of the wireless device 106 described herein.

The wireless device 106 of FIG. 11 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause one or more units 1100 to perform the functionality of the wireless device 106 described herein.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 12:
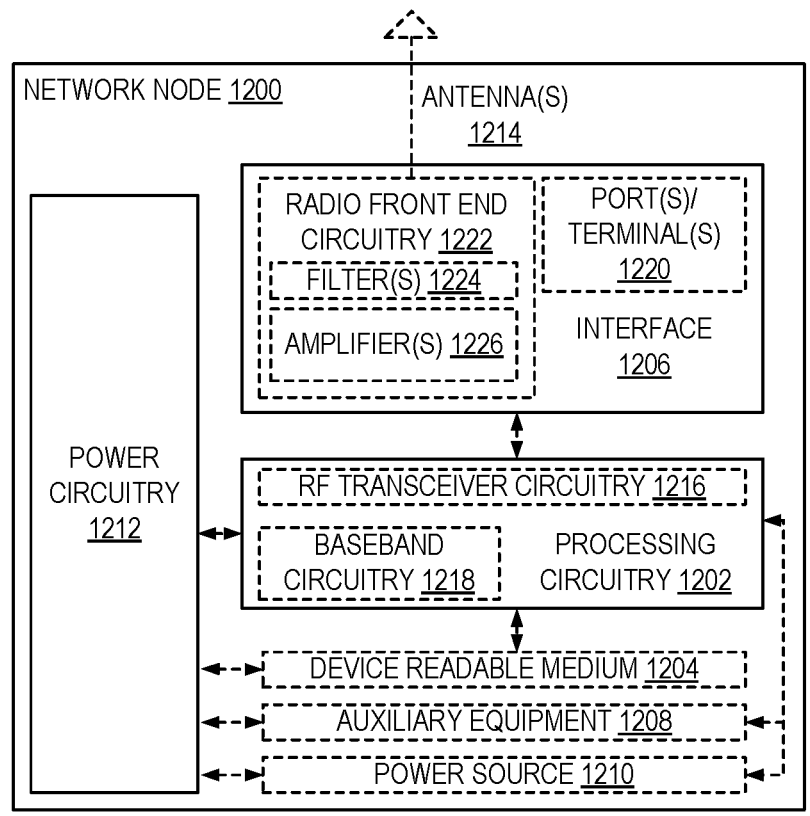
FIGS. 12 and 13 illustrate example embodiments of a network node.

FIG. 12 illustrates one example of a network node 1200 in accordance with some embodiments of the present disclosure. The network node 1200 may be a radio access node 102 or any other network node such as, e.g., a core network node. The network node 1200 includes various components described in more detail below. These components work together in order to provide network node functionality, such as providing wireless connections in a wireless network.

As illustrated, the network node 1200 includes processing circuitry 1202, a device readable medium 1204, an interface 1206, auxiliary equipment 1208, a power source 1210, power circuitry 1212, and an antenna(s) 1214. Although the radio access node 102 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 1200 are depicted as single boxes located within a larger box, or nested within multiple boxes, in practice, a network node may comprise multiple different physical components that make up a single illustrated component (e.g., the device readable medium 1204 may comprise multiple separate hard drives as well as multiple RAM modules).

Similarly, the network node 1200 may be composed of multiple physically separate components (e.g., a Node B component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1200 may be configured to support multiple Radio Access Technologies (RATs). In such embodiments, some components may be duplicated (e.g., a separate device readable medium 1204 for the different RATs) and some components may be reused (e.g., the same antenna 1214 may be shared by the RATs). The network node 1200 may also include multiple sets of the various illustrated components for different wireless technologies integrated into the network node 1200, such as, for example, GSM, WCDMA, LTE, NR, WiFi, or Bluetooth wireless technologies. These wireless technologies may be integrated into the same or a different chip or set of chips and other components within the network node 1200.

The processing circuitry 1202 is configured to perform any determining, calculating, or similar operations (e.g., certain obtaining operations) described herein as being provided by a network node. These operations performed by the processing circuitry 1202 may include processing information obtained by the processing circuitry 1202 by, for example, converting the obtained information into other information, comparing the obtained information or converted information to information stored in the network node, and/or performing one or more operations based on the obtained information or converted information, and as a result of said processing making a determination.

The processing circuitry 1202 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other network node 1200 components, such as the device readable medium 1204, network node 1200 functionality. For example, the processing circuitry 1202 may execute instructions stored in the device readable medium 1204 or in memory within the processing circuitry 1202. Such functionality may include providing any of the various wireless features, functions, or benefits discussed herein. In some embodiments, the processing circuitry 1202 may include a SOC.

In some embodiments, the processing circuitry 1202 may include one or more of RF transceiver circuitry 1216 and baseband processing circuitry 1218. In some embodiments, the RF transceiver circuitry 1216 and the baseband processing circuitry 1218 may be on separate chips (or sets of chips), boards, or units, such as radio units and digital units. In alternative embodiments, part or all of the RF transceiver circuitry 1216 and the baseband processing circuitry 1218 may be on the same chip or set of chips, boards, or units.

In certain embodiments, some or all of the functionality described herein as being provided by a network node or radio access node 102 may be performed by the processing circuitry 1202 executing instructions stored on the device readable medium 1204 or memory within the processing circuitry 1202. In alternative embodiments, some or all of the functionality may be provided by the processing circuitry 1202 without executing instructions stored on a separate or discrete device readable medium, such as in a hard-wired manner. In any of those embodiments, whether executing instructions stored on a device readable storage medium or not, the processing circuitry 1202 can be configured to perform the described functionality. The benefits provided by such functionality are not limited to the processing circuitry 1202 alone or to other components of the network node 1200, but are enjoyed by the network node 1200 as a whole, and/or by end users and the wireless network generally.

The device readable medium 1204 may comprise any form of volatile or non-volatile computer readable memory including, without limitation, persistent storage, solid state memory, remotely mounted memory, magnetic media, optical media, RAM, ROM, mass storage media (for example, a hard disk), removable storage media (for example, a flash drive, a CD or a DVD), and/or any other volatile or non-volatile, non-transitory device readable and/or computer-executable memory devices that store information, data, and/or instructions that may be used by the processing circuitry 1202. The device readable medium 1204 may store any suitable instructions; data or information, including a computer program; software; an application including one or more of logic, rules, code, tables, etc.; and/or other instructions capable of being executed by the processing circuitry 1202 and utilized by the network node 1200. The device readable medium 1204 may be used to store any calculations made by the processing circuitry 1202 and/or any data received via the interface 1206. In some embodiments, the processing circuitry 1202 and the device readable medium 1204 may be considered to be integrated.

The interface 1206 is used in the wired or wireless communication of signaling and/or data between the network node 1200, another network, and/or wireless devices 106. As illustrated, the interface 1206 comprises port(s)/terminal(s) 1220 to send and receive data, for example to and from the core network 104 over a wired connection. The interface 1206 also includes radio front end circuitry 1222 that may be coupled to, or in certain embodiments a part of, the antenna(s) 1214. The radio front end circuitry 1222 comprises filters 1224 and amplifiers 1226. The radio front end circuitry 1222 may be connected to the antenna(s) 1214 and the processing circuitry 1202. The radio front end circuitry 1222 may be configured to condition signals communicated between the antenna(s) 1214 and the processing circuitry 1202. The radio front end circuitry 1222 may receive digital data that is to be sent out to other network nodes or wireless devices via a wireless connection. The radio front end circuitry 1222 may convert the digital data into a radio signal having the appropriate channel and bandwidth parameters using a combination of the filters 1224 and/or the amplifiers 1226. The radio signal may then be transmitted via the antenna(s) 1214. Similarly, when receiving data, the antenna(s) 1214 may collect radio signals which are then converted into digital data by the radio front end circuitry 1222. The digital data may be passed to the processing circuitry 1202. In other embodiments, the interface 1206 may comprise different components and/or different combinations of components.

In certain alternative embodiments, the network node 1200 may not include separate radio front end circuitry 1222; instead, the processing circuitry 1202 may comprise radio front end circuitry and may be connected to the antenna(s) 1214 without separate radio front end circuitry 1222. Similarly, in some embodiments, all or some of the RF transceiver circuitry 1216 may be considered a part of the interface 1206. In still other embodiments, the interface 1206 may include the one or more ports or terminals 1220, the radio front end circuitry 1222, and the RF transceiver circuitry 1216 as part of a radio unit (not shown), and the interface 1206 may communicate with the baseband processing circuitry 1218, which is part of a digital unit (not shown).

The antenna(s) 1214 may include one or more antennas, or antenna arrays, configured to send and/or receive wireless signals. The antenna(s) 1214 may be coupled to the radio front end circuitry 1222 and may be any type of antenna capable of transmitting and receiving data and/or signals wirelessly. In some embodiments, the antenna(s) 1214 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a LoS antenna used to transmit/receive radio signals in a relatively straight line. In some instances, the use of more than one antenna may be referred to as MIMO. In certain embodiments, the antenna(s) 1214 may be separate from the network node 1200 and may be connectable to the network node 1200 through an interface or port.

The antenna(s) 1214, the interface 1206, and/or the processing circuitry 1202 may be configured to perform any receiving operations and/or certain obtaining operations described herein as being performed by a network node. Any information, data, and/or signals may be received from a wireless device, another network node, and/or any other network equipment. Similarly, the antenna(s) 1214, the interface 1206, and/or the processing circuitry 1202 may be configured to perform any transmitting operations described herein as being performed by a network node. Any information, data, and/or signals may be transmitted to a wireless device, another network node, and/or any other network equipment.

The power circuitry 1212 may comprise, or be coupled to, power management circuitry and is configured to supply the components of the network node 1200 with power for performing the functionality described herein. The power circuitry 1212 may receive power from the power source 1210. The power source 1210 and/or the power circuitry 1212 may be configured to provide power to the various components of the network node 1200 in a form suitable for the respective components (e.g., at a voltage and current level needed for each respective component). The power source 1210 may either be included in, or be external to, the power circuitry 1212 and/or the network node 1200. For example, the network node 1200 may be connectable to an external power source (e.g., an electricity outlet) via input circuitry or an interface such as an electrical cable, whereby the external power source supplies power to the power circuitry 1212. As a further example, the power source 1210 may comprise a source of power in the form of a battery or battery pack which is connected to, or integrated in, the power circuitry 1212. The battery may provide backup power should the external power source fail. Other types of power sources, such as photovoltaic devices, may also be used.

Alternative embodiments of the network node 1200 may include additional components beyond those shown in FIG. 12 that may be responsible for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
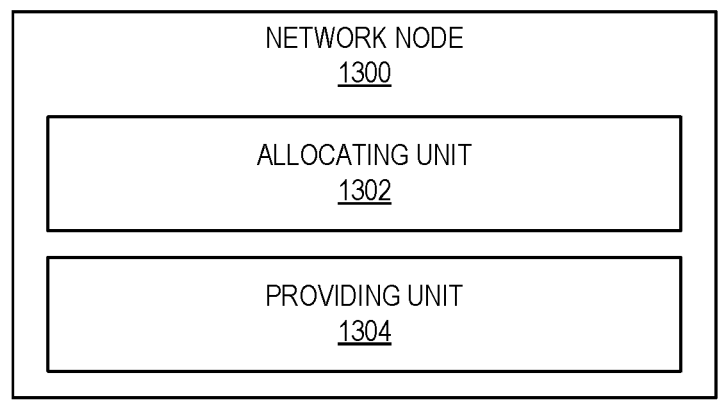

FIG. 13 illustrates a network node 1300 in accordance with some other embodiments of the present disclosure. Here, the network node 1300 is a "virtual apparatus." The network node 1300 is operable to carry out the example methods described with reference to FIGS. 3 through 7 and possibly any other processes or methods disclosed herein. It is also to be understood that the methods of FIGS. 3 through 7 are not necessarily carried out solely by the network node 1300. At least some operations of the method can be performed by one or more other entities.

The network node 1300 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause an allocating unit 1302 and a providing unit 1304, and any other suitable units of the network node 1300 to perform corresponding functions according one or more embodiments of the present disclosure.

As illustrated in FIG. 13, the network node 1300 includes the allocating unit 1302 and the providing unit 1304. The allocating unit 1302 is configured to select a sector-carrier or a particular wireless device 106 as described above with respect to step 300 of FIG. 3 or select a sector-carrier allocation for multiple wireless devices 106 as described above with respect to step 600 of FIG. 6. The providing unit 1304 is configured to provide an indication to one or more nodes regarding the selected sector-carrier or sector-carrier allocation as described above with respect to step 302 of FIG. 3 or step 602 of FIG. 6.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
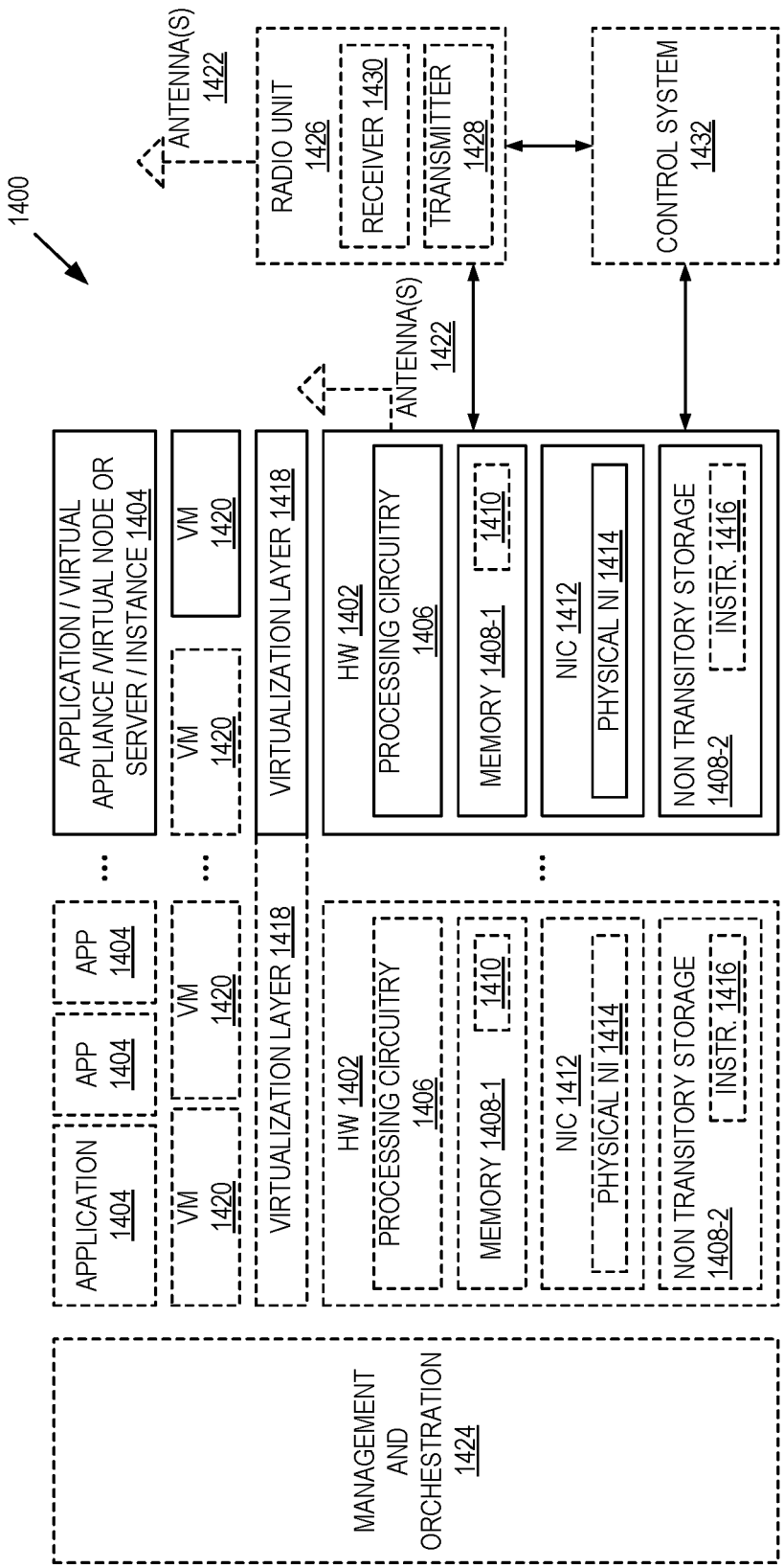
FIG. 14 is a schematic block diagram illustrating a virtualization environment in which functions implemented by some embodiments may be virtualized.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1402. Further, in embodiments in which the virtual node is not a radio access node or does not require radio connectivity (e.g., a core network node), then the network node may be entirely virtualized.

The functions may be implemented by one or more applications 1404 (which may alternatively be called software instances, virtual appliances, network functions, virtual nodes, virtual network functions, etc.) operative to implement some of the features, functions, and/or benefits of some of the embodiments disclosed herein. The applications 1404 are run in the virtualization environment 1400 which provides the hardware device 1402 comprising processing circuitry 1406 and memory 1408. The memory 1408 contains instructions 1410 executable by the processing circuitry 1406 whereby the application 1404 is operative to provide one or more of the features, benefits, and/or functions disclosed herein.

The virtualization environment 1400 comprises general-purpose or special-purpose network hardware devices 1402 comprising a set of one or more processors or processing circuitry 1406, which may be Commercial Off-the-Shelf (COTS) processors, dedicated ASICs, or any other type of processing circuitry including digital or analog hardware components or special purpose processors. Each hardware device 1402 may comprise memory 1408-1 which may be non-persistent memory for temporarily storing instructions 1410 or software executed by the processing circuitry 1406. Each hardware device 1402 may comprise one or more Network Interface Controllers (NICs) 1412, also known as network interface cards, which include a physical network interface 1414. Each hardware device 1402 may also include non-transitory, persistent, machine-readable storage media 1408-2 having stored therein software 1416 and/or instructions executable by the processing circuitry 1406. The software 1416 may include any type of software including software for instantiating one or more virtualization layers 1418 (also referred to as hypervisors), software to execute virtual machines 1420, as well as software allowing it to execute functions, features, and/or benefits described in relation with some embodiments described herein.

The applications 1420 comprise virtual processing, virtual memory, virtual networking or interface, and virtual storage, and may be run by a corresponding virtualization layer 1418 or hypervisor. Different embodiments of the instance of virtual appliance 1404 may be implemented on one or more of the virtual machines 1420, and the implementations may be made in different ways.

During operation, the processing circuitry 1406 executes the software 1416 to instantiate the hypervisor or virtualization layer 1418, which may sometimes be referred to as a Virtual Machine Monitor (VMM). The virtualization layer 1418 may present a virtual operating platform that appears like networking hardware to the virtual machine 1420.

As shown in FIG. 14, the hardware device 1402 may be a standalone network node with generic or specific components. The hardware device 1402 may comprise an antenna 1422 and may implement some functions via virtualization. Alternatively, the hardware device 1402 may be part of a larger cluster of hardware (e.g., such as in a data center or CPE) where many hardware nodes work together and are managed via a Management and Orchestration (MANO) 1424, which, among others, oversees lifecycle management of the applications 1404.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1420 may be a software implementation of a physical machine that runs programs as if they were executing on a physical, non-virtualized machine. Each of the virtual machines 1420, and that part of the hardware device 1402 that executes that virtual machine 1420, be it hardware dedicated to that virtual machine 1420 and/or hardware shared by that virtual machine 1420 with others of the virtual machines 1420, forms a separate Virtual Network Element (VNE).

Still in the context of NFV, Virtual Network Function (VNF) is responsible for handling specific network functions that run in one or more virtual machines 1420 on top of the hardware device 1402 and corresponds to the application 1404 in FIG. 14.

In some embodiments, one or more radio units 1426 that each include one or more transmitters 1428 and one or more receivers 1430 may be coupled to the one or more antennas 1422. The radio units 1426 may communicate directly with the hardware devices 1402 via one or more appropriate network interfaces and may be used in combination with the virtual components to provide a virtual node with radio capabilities, such as a radio access node or a base station.

In some embodiments, some signaling can be effected with the use of a control system 1432, which may alternatively be used for communication between the hardware devices 1402 and the radio unit 1426.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AoA Angle-of-Arrival
AoD Angle-of-Departure
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
CQI Channel Quality Indication
CSI Channel State Information D2D Device-to-Device
DAS Distributed Antenna System
DSP Digital Signal Processor
DVD Digital Video Disk
eNB Enhanced or Evolved Node B
E-SMLC Evolved Serving Mobile Location Center
FDD Frequency Division Duplexing
FPGA Field Programmable Gate Array
GHz Gigahertz
gNB New Radio Node B
GSM Global System for Mobile Communications
IoT Internet of Things
IP Internet Protocol
KPI Key Performance Indictor
LEE Laptop Embedded Equipment
LME Laptop Mounted Equipment
LoS Line-of-Sight
LTE Long Term Evolution
M2M Machine-to-Machine
MANO Management and Orchestration
MCE Multi-Cell/Multicast Coordination Entity
MDT Minimization of Drive Tests
MHz Megahertz
MIMO Multiple Input Multiple Output
MME Mobility Management Entity
MSC Mobile Switching Center
MSR Multi-Standard Radio
MTC Machine-Type Communication
MU-MIMO Multi-User Multiple Input Multiple Output
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
PDA Personal Digital Assistant
P-GW Packet Data Network Gateway
PMI Precoding Matrix Indicator
PRB Physical Resource Block
RAM Random Access Memory
RAT Radio Access Technology
RF Radio Frequency
RNC Radio Network Controller
ROM Read Only Memory
RRH Remote Radio Head
RRM Radio Resource Management
RRU Remote Radio Unit
RSRP Reference Signal Received Power
SCEF Service Capability Exposure Function
SOC System on a Chip
SON Self-Organizing Network
SU-MIMO Single User Multiple Input Multiple Output
TDD Time Division Duplexing
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WD-SC Wireless Device Sector-Carrier
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method of operation of a network node in a wireless communication system, comprising:
   selecting a sector-carrier for a wireless device from among a plurality of sector-carriers in accordance with a Multi-User Multiple Input Multiple Output, MU-MIMO, aware sector-carrier allocation procedure that takes into account possible MU-MIMO pairings for the wireless device on the plurality of sector-carriers, wherein, for each sector-carrier of the plurality of sector-carriers, the possible MU-MIMO pairings for the sector-carrier are determined based on predicted channel state information for a plurality of wireless devices, comprising the wireless device, on the sector-carrier; and
   providing an indication of the sector-carrier selected for the wireless device to at least one node selected from a group consisting of: another network node and the wireless device; and
   wherein selecting the sector-carrier for the wireless device from among the plurality of sector-carriers in accordance with the MU-MIMO aware sector-carrier allocation procedure comprises:
     obtaining actual or predicted channel state information for the wireless device for each of the plurality of sector-carriers;
     determining a subset of the plurality of sector-carriers for which the actual or predicted channel state information for the wireless device is better than a predefined threshold;
     for each sector-carrier in the subset of the plurality of sector-carriers, determining whether there are any possible MU-MIMO pairings for the wireless device on the sector-carrier; and
     selecting the sector-carrier for the wireless device from the subset of the plurality of sector-carriers in such a manner as to take into account any possible MU-MIMO pairings for the wireless device on the sector-carriers in the subset of the plurality of sector-carriers.

2. The method of claim 1 wherein, for each sector-carrier of the plurality of sector-carriers, the possible MU-MIMO pairings for the sector-carrier are determined based on the predicted channel state information for the plurality of wireless devices and predicted channel orthogonality between the predicted channels on the sector-carrier.

3. The method of claim 1 wherein selecting the sector-carrier for the wireless device from the subset of the plurality of sector-carriers in such a manner as to take into account any possible MU-MIMO pairings for the wireless device on the sector-carriers in the subset of the plurality of sector-carriers comprises:
   for each sector-carrier in the subset of the plurality of sector-carriers, computing a metric related to a predicted performance of the wireless communication system for an outcome of the MU-MIMO aware sector-carrier allocation procedure in which the sector-carrier is selected for the wireless device, wherein the metric is a function of any possible MU-MIMO pairings for the wireless device on the sector-carrier; and
   selecting the sector-carrier for the wireless device from the subset of the plurality of sector-carriers based on the metrics computed for the sector-carriers in the subset of the plurality of sector-carriers.

4. The method of claim 3 wherein the metric is a function of system throughput, energy performance, coverage, and/or quality of service.

5. The method of claim 1 wherein obtaining the actual or predicted channel state information for the wireless device for each of the plurality of sector-carriers comprises, for at least one of the plurality of sector-carriers, obtaining predicted channel state information for the wireless device for the at least one of the plurality of sector-carriers, the predicted channel state information being predicted using model training that is based on live network data.

6. The method of claim 5 wherein obtaining the predicted channel state information for the wireless device for the at least one of the plurality of sector-carriers comprises coordinating and/or signaling with at least one other network node to train and/or use a model for predicting the channel state information.

7. The method of claim 1 wherein possible MU-MIMO pairings for the wireless device on the subset of the plurality of sector-carriers are pairings with other wireless devices on a same sector-carrier for which a predicted channel orthogonality satisfies a predefined condition that is indicative of good channel orthogonality.

8. The method of claim 7 wherein the predicted channel orthogonality is predicted using model training based on live network data.

9. The method of claim 8 further comprising coordinating and/or signaling with at least one other network node to train and/or use a model for predicting the channel orthogonality.

10. The method of claim 1 wherein the sector-carrier selected for the wireless device is an uplink sector-carrier for the wireless device, wherein selection of the uplink sector-carrier for the wireless device is decoupled from selection of a downlink sector-carrier for the wireless device.

11. The method of claim 1 wherein the sector-carrier selected for the wireless device is a downlink sector-carrier for the wireless device, wherein selection of the downlink sector-carrier for the wireless device is decoupled from selection of an uplink sector-carrier for the wireless device.

12. The method of claim 1 wherein the network node is a radio access node.

13. The method of claim 12 wherein the plurality of sector-carriers are served by the radio access node.

14. The method of claim 12 wherein the plurality of sector-carriers comprise one or more sector-carriers served by the radio access node and one or more sector-carriers served by one or more other radio access nodes.

15. The method of claim 1 wherein the network node is a core network node, and the plurality of sector-carriers are served by two or more radio access nodes associated with the core network node.

16. A network node for a wireless communication system, comprising:
an interface; and
processing circuitry configured to:
select a sector-carrier for a wireless device from among a plurality of sector-carriers in accordance with a Multi-User Multiple Input Multiple Output, MU-MIMO, aware sector-carrier allocation procedure that takes into account possible MU-MIMO pairings for the wireless device on the plurality of sector-carriers, wherein, for each sector-carrier of the plurality of sector-carriers, the possible MU-MIMO pairings for the sector-carrier are determined based on predicted channel state information for a plurality of wireless devices, comprising the wireless device, on the sector-carrier; and
provide an indication of the sector-carrier selected for the wireless device to at least one node selected from a group consisting of: another network node and the wireless device; and
wherein selecting the sector-carrier for the wireless device from among the plurality of sector-carriers in accordance with the MU-MIMO aware sector-carrier allocation procedure comprises:
obtaining actual or predicted channel state information for the wireless device for each of the plurality of sector-carriers;
determining a subset of the plurality of sector-carriers for which the actual or predicted channel state information for the wireless device is better than a predefined threshold;
for each sector-carrier in the subset of the plurality of sector-carriers, determining whether there are any possible MU-MIMO pairings for the wireless device on the sector-carrier; and
selecting the sector-carrier for the wireless device from the subset of the plurality of sector-carriers in such a manner as to take into account any possible MU-MIMO pairings for the wireless device on the sector-carriers in the subset of the plurality of sector-carriers.

17. A method of operation of a network node in a wireless communication system, comprising:
selecting a sector-carrier allocation for a plurality of wireless devices on a plurality of sector-carriers in accordance with a Multi-User Multiple Input Multiple Output, MU-MIMO, aware sector-carrier allocation procedure that takes into account possible MU-MIMO pairings for the plurality of wireless devices on the plurality of sector-carriers, the sector-carrier allocation comprising a selected sector-carrier for each of the plurality of wireless devices, wherein, for each sector-carrier of the plurality of sector-carriers, the possible MU-MIMO pairings for the sector-carrier are determined based on predicted channel state information for the plurality of wireless devices on the sector-carrier; and
providing an indication of the sector-carrier allocation for the plurality of wireless devices to a set of nodes selected from a group consisting of: a set of nodes comprising another network node and a set of nodes comprising the plurality of wireless devices; and
wherein selecting the sector-carrier allocation for the plurality of wireless devices in accordance with the MU-MIMO aware sector-carrier allocation procedure comprises:
obtaining actual or predicted channel state information for each of the plurality of wireless devices for each of the plurality of sector-carriers;
determining a plurality of Wireless Device Sector-Carrier, WD-SC, pairings for which the actual or predicted channel state information is better than a predefined threshold;
identifying a plurality of possible MU-MIMO pairings based on the plurality of WD-SC pairings, wherein each possible MU-MIMO pairing comprises a first wireless device on a particular sector-carrier defined by a first WD-SC pairing and a second wireless device on the particular sector-carrier defined by a second WD-SC pairing for which a predicted channel orthogonality satisfies a predefined condition;

for each possible sector-carrier allocation of two or more possible sector-carrier allocations, computing a metric that is related to a predicted performance of the wireless communication system for the possible sector-carrier allocation that takes into account any of the plurality of possible MU-MIMO pairings that are applicable to the possible sector-carrier allocation; and selecting the sector-carrier allocation for the plurality of wireless devices from the two or more possible sector-carrier allocations based on the metrics computed for the two or more possible sector-carrier allocations.

18. The method of claim 17 wherein, for each sector-carrier of the plurality of sector-carriers, the possible MU-MIMO pairings for the sector-carrier are determined based on the predicted channel state information for the plurality of wireless devices and predicted channel orthogonality between the predicted channels on the sector-carrier.

19. The method of claim 17 wherein the metric is a function of system throughput, energy performance, coverage, and/or quality of service.

20. The method of claim 17 wherein obtaining the actual or predicted channel state information for each of the plurality of wireless devices for each of the plurality of sector-carriers comprises, for at least one of the plurality of wireless devices and at least one of the plurality of sector-carriers, obtaining predicted channel state information for the at least one of the plurality of wireless devices for the at least one of the plurality of sector-carriers, the predicted channel state information being predicted using model training that is based on live network data.

21. The method of claim 20 wherein obtaining the predicted channel state information for the at least one of the plurality of wireless devices for the at least one of the plurality of sector-carriers comprises coordinating and/or signaling with at least one other network node to train and/or use a model for predicting the channel state information.

22. The method of claim 17 wherein the predicted channel orthogonality is predicted using model training based on live network data.

23. The method of claim 22 wherein the predicted channel orthogonality is predicted using model training based on live network data.

24. The method of claim 17 wherein the sector-carrier allocation selected for the plurality of wireless devices is an uplink sector-carrier allocation for the plurality of wireless devices, wherein selection of the uplink sector-carrier allocation for the plurality of wireless devices is decoupled from selection of a downlink sector-carrier allocation for the plurality of wireless devices.

25. The method of claim 17 wherein the sector-carrier allocation selected for the plurality of wireless devices is a downlink sector-carrier allocation for the plurality of wireless devices, wherein selection of the downlink sector-carrier allocation for the plurality of wireless devices is decoupled from selection of an uplink sector-carrier allocation for the plurality of wireless devices.

26. The method of claim 17 wherein the network node is a radio access node.

27. The method of claim 26 wherein the plurality of sector-carriers are served by the radio access node.

28. The method of claim 26 wherein the plurality of sector-carriers comprise one or more sector-carriers served by the radio access node and one or more sector-carriers served by one or more other radio access nodes.

29. The method of claim 17 wherein the network node is a core network node, and the plurality of sector-carriers are served by two or more radio access nodes associated with the core network node.

30. A network node for a wireless communication system, comprising:

an interface; and processing circuitry configured to:

select a sector-carrier allocation for a plurality of wireless devices on a plurality of sector-carriers in accordance with a Multi-User Multiple Input Multiple Output, MU-MIMO, aware sector-carrier allocation procedure that takes into account possible MU-MIMO pairings for the plurality of wireless devices on the plurality of sector-carriers, the sector-carrier allocation comprising a selected sector-carrier for each of the plurality of wireless devices wherein, for each sector-carrier of the plurality of sector-carriers, the possible MU-MIMO pairings for the sector-carrier are determined based on predicted channel state information for the plurality of wireless devices on the sector-carrier; and provide an indication of the sector-carrier allocation for the plurality of wireless devices to at least a node or set of nodes selected from a group consisting of: another network node and the plurality of wireless devices; and wherein selecting the sector-carrier allocation for the plurality of wireless devices in accordance with the MU-MIMO aware sector-carrier allocation procedure comprises:

obtaining actual or predicted channel state information for each of the plurality of wireless devices for each of the plurality of sector-carriers;

determining a plurality of Wireless Device Sector-Carrier, WD-SC, pairings for which the actual or predicted channel state information is better than a predefined threshold;

identifying a plurality of possible MU-MIMO pairings based on the plurality of WD-SC pairings, wherein each possible MU-MIMO pairing comprises a first wireless device on a particular sector-carrier defined by a first WD-SC pairing and a second wireless device on the particular sector-carrier defined by a second WD-SC pairing for which a predicted channel orthogonality satisfies a predefined condition;

for each possible sector-carrier allocation of two or more possible sector-carrier allocations, computing a metric that is related to a predicted performance of the wireless communication system for the possible sector-carrier allocation that takes into account any of the plurality of possible MU-MIMO pairings that are applicable to the possible sector-carrier allocation; and selecting the sector-carrier allocation for the plurality of wireless devices from the two or more possible sector-carrier allocations based on the metrics computed for the two or more possible sector-carrier allocations.

\* \* \* \* \*